United States Patent
Katougi et al.

(10) Patent No.: US 10,388,251 B2
(45) Date of Patent: Aug. 20, 2019

(54) IMAGE PROCESSING DEVICE, DISPLAY DEVICE, POSITION DETERMINING DEVICE, POSITION DETERMINING METHOD, AND RECORDING MEDIUM

(71) Applicant: Sharp Kabushiki Kaisha, Sakai, Osaka (JP)

(72) Inventors: Terumitsu Katougi, Sakai (JP); Hideki Ohnishi, Sakai (JP); Yasushi Adachi, Sakai (JP); Makoto Hayasaki, Sakai (JP); Gaku Furuichi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 149 days.

(21) Appl. No.: 15/516,036

(22) PCT Filed: Sep. 24, 2015

(86) PCT No.: PCT/JP2015/076977
§ 371 (c)(1),
(2) Date: Mar. 31, 2017

(87) PCT Pub. No.: WO2016/052309
PCT Pub. Date: Apr. 7, 2016

(65) Prior Publication Data
US 2017/0316754 A1 Nov. 2, 2017

(30) Foreign Application Priority Data

Oct. 3, 2014 (JP) .................................. 2014-205264
Oct. 3, 2014 (JP) .................................. 2014-205265

(51) Int. Cl.
*G09G 5/06* (2006.01)
*G09G 5/00* (2006.01)
(Continued)

(52) U.S. Cl.
CPC ............. *G09G 5/06* (2013.01); *G06F 3/1446* (2013.01); *G09G 3/007* (2013.01); *G09G 3/2003* (2013.01);
(Continued)

(58) Field of Classification Search
CPC ........ G09G 5/06; G09G 5/026; G09G 3/3426; G09G 5/022; G09G 3/2003; G09G 3/007;
(Continued)

(56) References Cited

U.S. PATENT DOCUMENTS

2014/0285511 A1* 9/2014 Hoshino .................. G09G 5/10
345/590

FOREIGN PATENT DOCUMENTS

JP 2013-097115 A 5/2013
JP 2014-026120 A 2/2014

* cited by examiner

*Primary Examiner* — Rodney Amadiz
(74) *Attorney, Agent, or Firm* — Keating & Bennett, LLP

(57) ABSTRACT

A display device (10) includes: an integrated control unit (31) that allows selection from among at least a high-luminance mode and a luminance-unevenness-suppression-preferred mode in accordance with an input instruction; and an unevenness correction unit (36) that performs color unevenness correction for each pixel in both the high-luminance mode and the luminance-unevenness-suppression-preferred mode. In the luminance-unevenness-suppression-preferred mode, the unevenness correction unit (36) performs a pixel value limitation process for uniformly shifting, for each pixel, a pixel value in image data to a lower pixel value to thereby decrease the pixel value to a pixel value lower than that in the high-luminance mode, and thereafter, performs the color unevenness correction.
(Continued)

Accordingly, even if the use of the display device varies, image processing that is appropriate for various uses is implemented.

14 Claims, 22 Drawing Sheets

(51) Int. Cl.
- *G09G 5/02* (2006.01)
- *G09G 5/10* (2006.01)
- *G09G 3/00* (2006.01)
- *G09G 3/20* (2006.01)
- *G06F 3/14* (2006.01)
- *G09G 3/34* (2006.01)

(52) U.S. Cl.
CPC .............. *G09G 3/3426* (2013.01); *G09G 5/00* (2013.01); *G09G 5/02* (2013.01); *G09G 5/022* (2013.01); *G09G 5/026* (2013.01); *G09G 5/10* (2013.01); *G09G 2300/026* (2013.01); *G09G 2320/0666* (2013.01); *G09G 2320/0686* (2013.01); *G09G 2320/0693* (2013.01); *G09G 2340/06* (2013.01); *G09G 2354/00* (2013.01); *G09G 2356/00* (2013.01); *G09G 2360/04* (2013.01); *G09G 2370/12* (2013.01)

(58) Field of Classification Search
CPC .. G09G 5/02; G09G 5/00; G09G 5/10; G09G 2340/06; G09G 2320/0693; G09G 2300/026; G09G 2320/0666; G09G 2370/12; G09G 2354/00; G09G 2360/04; G09G 2320/0686; G09G 2356/00; G06F 3/1446

See application file for complete search history.

FIG. 2

|   | R | G | B | X | Y | Z |
|---|---|---|---|---|---|---|
| 1 | 0 | 0 | 0 | 0.904 | 0.716 | 1.899 |
| 547 | 192 | 192 | 192 | 405.7 | 406.8 | 620.1 |
| 548 | 192 | 192 | 224 | 447.4 | 420.4 | 830.2 |
| 549 | 192 | 192 | 255 | 493.5 | 435.2 | 1063 |
| 556 | 192 | 224 | 192 | 455.4 | 516.8 | 629.2 |
| 557 | 192 | 224 | 224 | 497.1 | 530.3 | 839.2 |
| 558 | 192 | 224 | 255 | 543.1 | 545.1 | 1071 |
| 628 | 224 | 192 | 192 | 463.5 | 435.6 | 620.1 |
| 629 | 224 | 192 | 224 | 505 | 449.2 | 830.1 |
| 630 | 224 | 192 | 255 | 551.2 | 463.9 | 1062 |
| 637 | 224 | 224 | 192 | 515.8 | 548.4 | 631.7 |
| 638 | 224 | 224 | 224 | 557.9 | 562.1 | 843.3 |
| 639 | 224 | 224 | 255 | 604.4 | 577 | 1078 |
| 729 | 255 | 255 | 255 | 718.2 | 723.7 | 1089 |

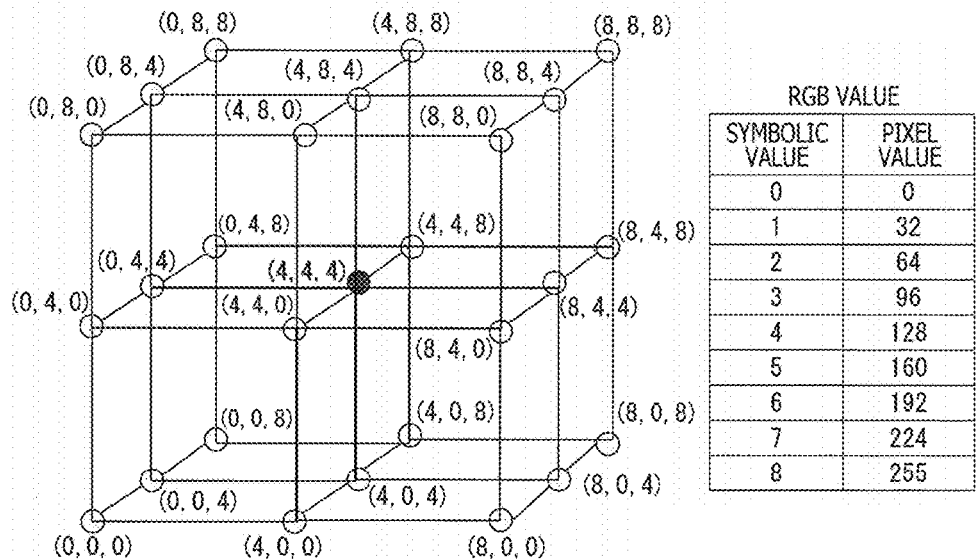

FIG. 7

|  | 1ST SET | | | 2ND SET | | | .. | .. | .. | .. | .. | 27TH SET | | |
|---|---|---|---|---|---|---|---|---|---|---|---|---|---|---|
| | R | G | B | R | G | B | | | | | | R | G | B |
| 1 | 0 | 0 | 0 | 0 | 0 | | | | | | | | 0 | 0 |
| 2 | 0 | 1 | 1 | 1 | 1 | | | | | | | | 1 | 1 |
| 3 | −1 | −1 | 0 | −1 | 0 | | | | | | | | 0 | −1 |
| 4 | | | | | | | | | | | | | | |
| .. | | | | | | | | | | | | | | |
| 255 | 3 | −1 | 2 | 1 | 3 | | | | | | | | 3 | 3 |
| 256 | −3 | −2 | 2 | −3 | 0 | | | | | | | | −2 | 2 |

IDENTIFICATION NUMBER

FIG. 8

| | 1 | 2 | 3 | 4 | 5 | .. | .. | .. | .. | .. | .. | .. | 1919 | 1920 |
|---|---|---|---|---|---|---|---|---|---|---|---|---|---|---|
| 1 | 256 | 25 | 7 | 7 | 37 | | | | | | | | 16 | 16 |
| 2 | 140 | 140 | 7 | 184 | 184 | | | | | | | | 207 | 207 |
| 3 | 55 | 83 | 184 | 157 | 110 | | | | | | | | 221 | 16 |
| 4 | 55 | 83 | 157 | 110 | 110 | | | | | | | | 221 | 16 |
| .. | | | | | | | | | | | | | | |
| 1079 | 188 | 156 | 156 | 58 | 66 | | | | | | | | 221 | 16 |
| 1080 | 156 | 156 | 156 | 58 | 172 | | | | | | | | 16 | 16 |

FIG. 9
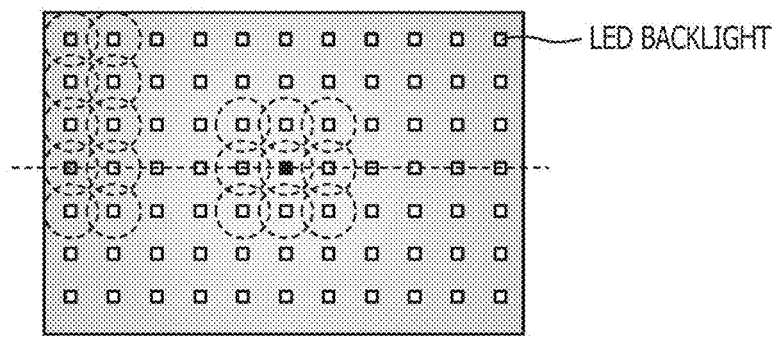
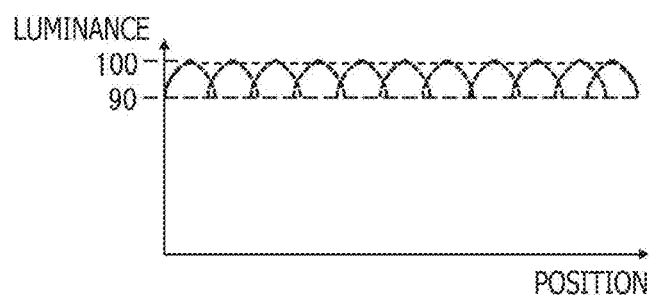
FIG. 10
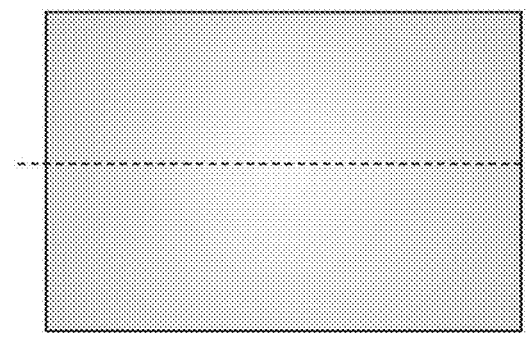
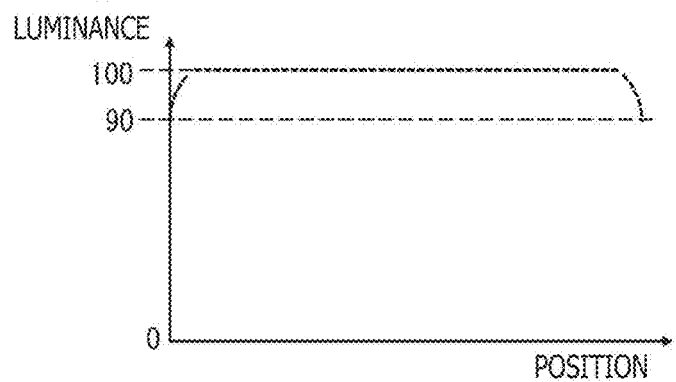

FIG. 20

| MODE NUMBER | MODE | COLOR MEASUREMENT DATA SET USED |
|---|---|---|
| 0 | NON-CORRECTION | MEASUREMENT DATA SET 0 |
| 1 | HIGH-LUMINANCE | MEASUREMENT DATA SET 1 |
| 2 | INTERMEDIATE | MEASUREMENT DATA SET 2 |
| 3 | LUMINANCE-UNEVENNESS-SUPPRESSION-PREFERRED | MEASUREMENT DATA SET 3 |

FIG. 21

| IDENTIFICATION NUMBER OF DISPLAY DEVICE | MEASUREMENT DATA SET 0 FOR N COLORS | | MEASUREMENT DATA SET 1 FOR M COLORS | | MEASUREMENT DATA SET 2 FOR M COLORS | | MEASUREMENT DATA SET 3 FOR M COLORS | |
|---|---|---|---|---|---|---|---|---|
| | MEASUREMENT DATA (DISPLAY COLOR 1) | MEASUREMENT DATA (DISPLAY COLOR N) | MEASUREMENT DATA (DISPLAY COLOR 1) | MEASUREMENT DATA (DISPLAY COLOR M) | MEASUREMENT DATA (DISPLAY COLOR 1) | MEASUREMENT DATA (DISPLAY COLOR M) | MEASUREMENT DATA (DISPLAY COLOR 1) | MEASUREMENT DATA (DISPLAY COLOR M) |
| XX0000 | XX0000-1 | XX0000-N | XX0000-1M1 | XX0000-MM1 | XX0000-1M2 | XX0000-MM2 | XX0000-1M3 | XX0000-MM3 |
| XX0001 | XX0001-1 | XX0001-N | XX0001-1M1 | XX0001-MM1 | XX0001-1M2 | XX0001-MM2 | XX0001-1M3 | XX0001-MM3 |
| XX0002 | XX0002-1 | XX0002-N | XX0002-1M1 | XX0002-MM1 | XX0002-1M2 | XX0002-MM2 | XX0002-1M3 | XX0002-MM3 |
| XX0003 | XX0003-1 | XX0003-N | XX0003-1M1 | XX0003-MM1 | XX0003-1M2 | XX0003-MM2 | XX0003-1M3 | XX0003-MM3 |
| XX0004 | XX0004-1 | XX0004-N | XX0004-1M1 | XX0004-MM1 | XX0004-1M2 | XX0004-MM2 | XX0004-1M3 | XX0004-MM3 |
| XX0005 | XX0005-1 | XX0005-N | XX0005-1M1 | XX0005-MM1 | XX0005-1M2 | XX0005-MM2 | XX0005-1M3 | XX0005-MM3 |
| ... | ... | ... | ... | ... | ... | ... | ... | ... |
| XX0016 | XX0016-1 | XX0016-N | XX0016-1M1 | XX0016-MM1 | XX0016-1M2 | XX0016-MM2 | XX0016-1M3 | XX0016-MM3 |
| XX0017 | XX0017-1 | XX0017-N | XX0017-1M1 | XX0017-MM1 | XX0017-1M2 | XX0017-MM2 | XX0017-1M3 | XX0017-MM3 |
| XX0018 | XX0018-1 | XX0018-N | XX0018-1M1 | XX0018-MM1 | XX0018-1M2 | XX0018-MM2 | XX0018-1M3 | XX0018-MM3 |
| XX0019 | XX0019-1 | XX0019-N | XX0019-1M1 | XX0019-MM1 | XX0019-1M2 | XX0019-MM2 | XX0019-1M3 | XX0019-MM3 |
| XX0020 | XX0020-1 | XX0020-N | XX0020-1M1 | XX0020-MM1 | XX0020-1M2 | XX0020-MM2 | XX0020-1M3 | XX0020-MM3 |
| ... | ... | ... | ... | ... | ... | ... | ... | ... |
| XXXXXX | XXXXXX-1 | XXXXXX-N | XXXXXX-1M1 | XXXXXX-MM1 | XXXXXX-1M2 | XXXXXX-MM2 | XXXXXX-1M3 | XXXXXX-MM3 |

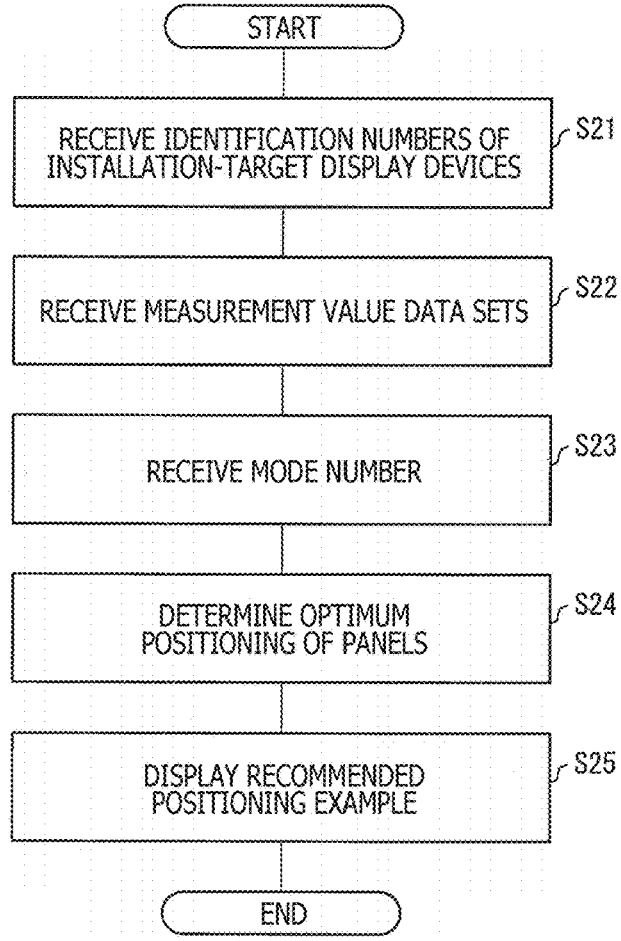
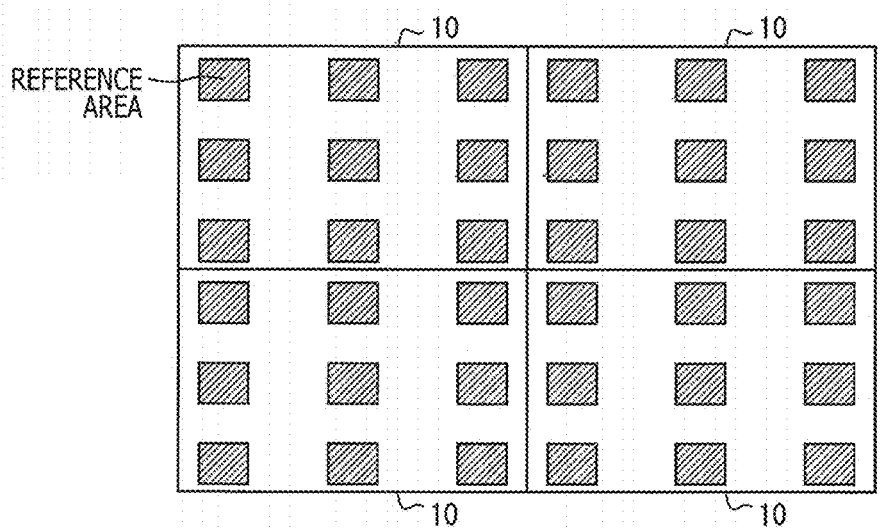

FIG. 29

```
          ~10a              ~10b
┌─────────────────┬─────────────────┐
│ RECOMMENDED  P1 │ P2 RECOMMENDED  │
│ POSITION (1, 1) □│ □  POSITION (1, 2)│
│    XX0016       │      XX0003     │
│                 │                 │
│  P3 □           │        P4 □     │
├─────────────────┼─────────────────┤
│  P5 □           │        P6 □     │
│ RECOMMENDED     │    RECOMMENDED  │
│ POSITION (2, 1) │    POSITION (2, 2)│
│    XX0020    □  │  □    XX0001    │
│             P7  │ P8              │
└─────────────────┴─────────────────┘
          ~10c              ~10d
```

IMAGE PROCESSING DEVICE, DISPLAY DEVICE, POSITION DETERMINING DEVICE, POSITION DETERMINING METHOD, AND RECORDING MEDIUM

TECHNICAL FIELD

The present invention relates to an image processing device, a display device, a program, and a recording medium for correcting display unevenness by using adjustment data obtained in a calibration process. The present invention further relates to a position determining device for determining, in a multi-display formed by arranging a plurality of display devices, optimum positioning of the display devices.

BACKGROUND ART

Currently, signage or information display using a large-screen display device has various uses, and a system that enables large-screen display with a single display panel, or a system in which a plurality of display panels are positioned in a matrix to constitute a multi-display having a large screen and to perform display is increasingly used.

A display using a liquid crystal panel is constituted by a liquid crystal panel formed by filling a gap between a pair of glass substrates with a liquid crystal substance, and backlights positioned on the back of the liquid crystal panel, and displays an image by driving the liquid crystal panel in accordance with an image signal fed from an external device, such as a PC (personal computer) or a playback device.

In a liquid crystal display device, a gate driver and a source driver are mounted as a driving circuit for the liquid crystal panel. The gate driver is connected to the gate of each transistor that drives a corresponding pixel of the liquid crystal panel, and the source driver is connected to the source of each transistor. The gate driver performs on/off control on each transistor on the basis of an input image signal, the source driver applies, to each transistor that is turned on, a voltage (an input level for the liquid crystal panel) that corresponds to the image signal to thereby change the light transmittance, which is determined on the basis of the electro-optic properties of the liquid crystal substance. As a result, the liquid crystal display device can represent gradations by controlling, on a per pixel basis, the amount of light that is emitted from the backlights and passes through the liquid crystal panel.

The electro-optic properties of the liquid crystal substance is determined on the basis of the gap, namely, the cell gap, between the glass substrates, which is filled with the liquid crystal substance. However, due to variations in manufacture or other factors, pixels having a small cell gap and pixels having a large cell gap relative to the design value are present in a mixed manner, the light transmittance of each pixel deviates from the design value, desired gradation properties are not achieved, and luminance unevenness or color unevenness occurs in the liquid crystal panel. In the liquid crystal display device, luminance unevenness also occurs due to variations or fluctuations in the properties among the plurality of light sources used for the backlights.

Accordingly, for liquid crystal display devices, a calibration process for creating a luminance adjustment table for correcting luminance unevenness and a calibration process for creating a chromaticity adjustment table for correcting chromaticity unevenness from data obtained by capturing images of displayed test images are currently performed to correct unevenness of image data by using these adjustment tables.

CITATION LIST

Patent Literature

PTL 1: Japanese Unexamined Patent Application Publication No. 2013-97115

PTL 2: Japanese Unexamined Patent Application Publication No. 2014-26120

SUMMARY OF INVENTION

Technical Problem

In a case where a display device is used for signage or information display, it is desirable to perform high-luminance display to the extent possible. However, in luminance unevenness correction, an adjustment is made so as to make the luminance of a bright portion closer to the luminance of a dark portion. Therefore, maintaining the luminance of the entire display unit at a high level has a trade-off relationship with suppressing luminance unevenness (luminance non-uniformity) and making the luminance uniform.

Meanwhile, if the ratio of the luminance of a dark portion (mostly in a display screen edge portion) of a display unit relative to the luminance of a bright portion (a portion other than the display screen edge portion) of the display unit in a case where an image in which pixel values are uniform is displayed is equal to or larger than a predetermined ratio, luminance unevenness occurs in the display screen edge portion but is not so noticeable depending on the specifications of the display device. If the luminance of a bright portion in the display unit is adjusted to the low luminance of the screen edge portion, the entire display unit becomes dark. Accordingly, some display devices for signage or information display is configured to correct color unevenness (color non-uniformity) without adjusting the luminance of a bright portion in the display unit to the low luminance of the display screen edge portion. As a consequence, luminance unevenness in the display screen edge portion remains but is at a level such that the luminance unevenness is not noticeable for use, and the luminance (brightness) of the entire screen can be maintained at a high level.

If a single display device thus designed for signage is used, luminance unevenness in the display screen edge portion is not noticeable. However, if such a display device is used as a display device that constitutes a multi-display, luminance unevenness becomes noticeable and tends to be easily perceived. This is because the degree of a drop in the luminance differs between display devices adjacent to each other, or the display screen edge portion, which is not so closely watched in a case of a single display device, is watched closely in a case where one image is displayed by using a plurality of display devices.

Therefore, in a case where a user who purchases a display device designed for signage uses the display device for stand-alone signage, and thereafter, uses the display device as part of a multi-display due to a change in use, a problem arises in which luminance unevenness becomes noticeable.

An object of the present invention is to provide an image processing device, a display device, a program, and a recording medium with which, even if the use of a display device varies, image processing that is appropriate for various uses can be implemented.

Solution to Problem

In order to achieve the object, an image processing device according to one aspect of the present invention includes: a selection unit that allows selection from among at least a first mode and a second mode, which are image quality adjustment modes, in accordance with an input instruction; and a correction unit that performs, both in the first mode and the second mode, color unevenness correction on image data of an image to be displayed on a display panel by using color unevenness correction data obtained by performing a calibration process. In the second mode, the correction unit performs a pixel value limitation process for uniformly shifting, for each pixel, a pixel value in the image data to a lower pixel value to thereby decrease the pixel value to a pixel value lower than a corresponding pixel value in the first mode, and thereafter, performs the color unevenness correction.

Advantageous Effects of Invention

In the configuration according to the present invention, in the second mode, the pixel value limitation process for shifting the pixel values in the image data to lower pixel values is performed, and thereafter, color unevenness correction is performed. It has been found that, in the second mode, the luminance of the entire image is lower but the degree of luminance unevenness suppression associated with color unevenness suppression is higher than those in the first mode, which corresponds to either of a case of performing color unevenness correction without performing the pixel value limitation process or a case of performing the pixel value limitation process while making the degree of the shift lower than that in the second mode, and thereafter, performing color unevenness correction.

Accordingly, in the configuration according to the present invention, in a case where high-luminance display is much needed (for example, in a case of using a display device for signage), the first mode is selected to thereby decrease the degree of associated luminance unevenness suppression and enable display of a high-luminance range and, in a case where luminance unevenness suppression is much needed (for example, in a case of using a display device as one of the display devices included in a multi-display), the second mode is selected to thereby decrease the luminance of the entire image and increase the degree of associated luminance unevenness suppression. That is, for uses in which high-luminance display is much needed, high-luminance display can be implemented and, for uses in which luminance unevenness suppression is much needed, the degree of luminance unevenness suppression can be increased. Accordingly, an effect is produced in which, even if the use of a display device varies, image processing that is appropriate for various uses can be implemented.

Note that, in one aspect of the present invention, the pixel value limitation process is performed, and thereafter, color unevenness correction is performed. Therefore, color unevenness suppression is performed while the effect of luminance unevenness suppression associated with the color unevenness suppression is increased, which is an advantage. Here, in the pixel value limitation process, the same adjustment is uniformly made to all pixels, and therefore, the computer is not overloaded. As a result, according to the present invention, the load of the computer is reduced as much as possible while both color unevenness and luminance unevenness are effectively reduced. On the other hand, PTL 1 (Japanese Unexamined Patent Application Publication No. 2013-97115) describes a configuration in which color unevenness correction is originally not performed, and therefore, does not offer an advantage as offered by the present invention.

BRIEF DESCRIPTION OF DRAWINGS

FIG. 2 is a diagram illustrating reference data.

FIG. 5A illustrates data that indicates adjustment values for one pixel in data included in a color unevenness correction table.

FIG. 5B illustrates data that indicates adjustment values for one pixel in the data included in the color unevenness correction table, and illustrates an example different from the example in FIG. 5A.

FIG. 6 illustrates a color space in which 27 sets of RGB values for which adjustment values are indicated in the color unevenness correction table are respectively represented as lattice points.

FIG. 7 is a diagram schematically illustrating a color unevenness correction map.

FIG. 8 is a diagram schematically illustrating an index map.

FIG. 9 is a diagram schematically illustrating backlights of a display device.

FIG. 10 is a diagram schematically illustrating luminance unevenness on a display screen in a case where the display device is used as a stand-alone device.

FIG. 20 is a table illustrating relationships between modes and measurement data sets.

FIG. 21 is a diagram illustrating a database which is stored on an installation server illustrated in FIG. 18 and in which measurement data sets are accumulated.

FIG. 22 is a flowchart illustrating a flow of processing in an installation process illustrated in FIG. 18.

FIG. 23 is a diagram schematically illustrating reference areas set in each display device that constitutes a multi-display according to the second embodiment.

FIG. 29 is an explanatory diagram illustrating target points that are set when offset values according to a fourth embodiment are calculated.

DESCRIPTION OF EMBODIMENTS

First Embodiment

Hereinafter, a first embodiment is described with reference to the drawings. Note that, in this embodiment, color unevenness refers to a state in which variations in color (for example, chromaticity calculated from measured values) occur among pixels, the variations being caused by, for example, differences in the properties of the pixels due to a structural factor of the display device. Further, luminance unevenness refers to a state in which the luminance (measured luminance) decreases in a direction from the center portion of the display screen toward the edge portion thereof, which is caused by, for example, differences in the properties of the backlights, or a state in which variations in luminance occur among pixels, the variations being caused by, for example, differences in the properties of the pixels, for example.

(Configuration of Display Calibration System)

Figure 1:
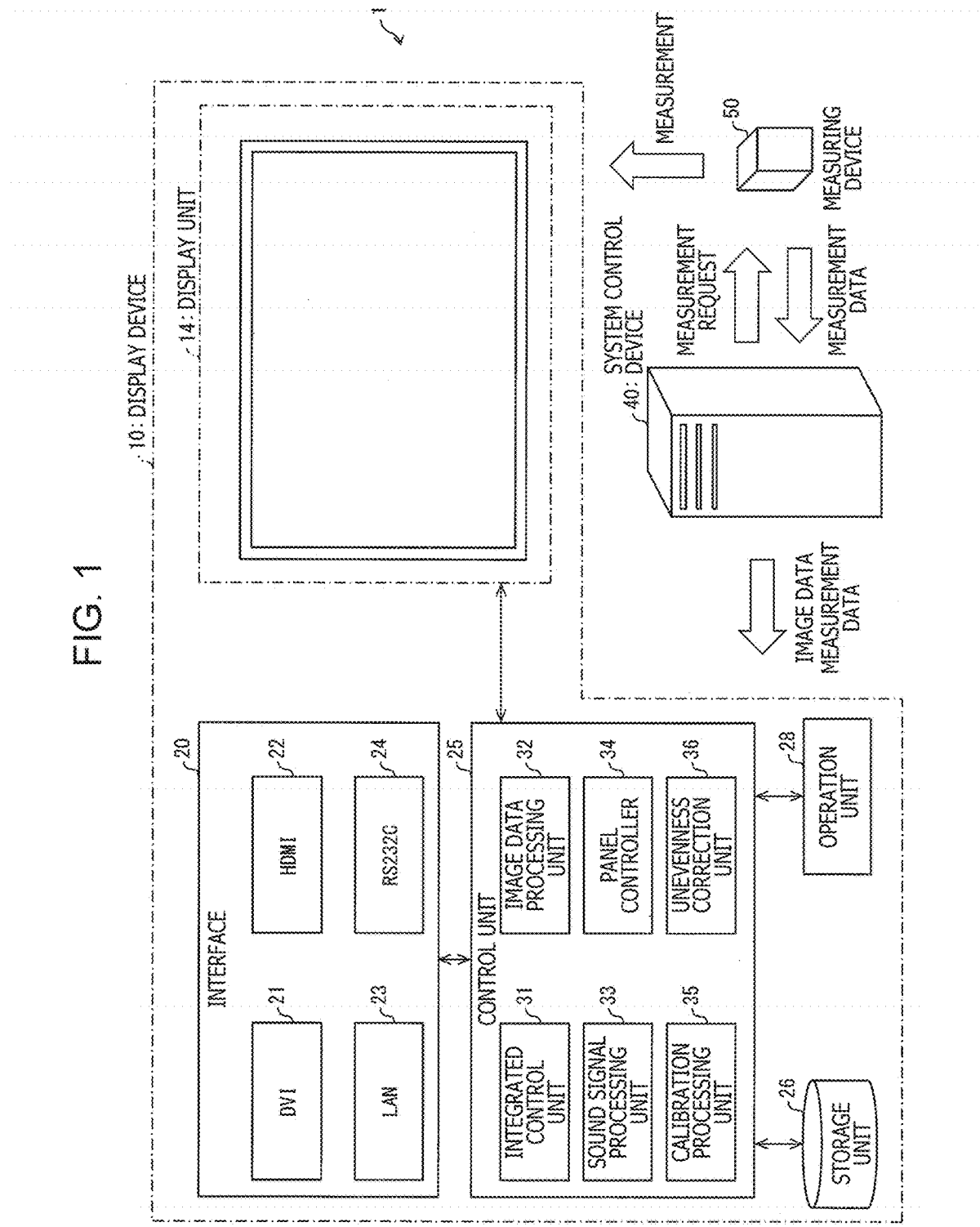
FIG. 1 is a block diagram illustrating an overall configuration of a display calibration system according to a first embodiment.

As illustrated in FIG. 1, a display calibration system 1 according to this embodiment includes a display device 10, a system control device (computer) 40, and a measuring device 50. The display device 10 includes an interface 20, a control unit 25, a storage unit 26, an operation unit 28, and a display unit 14.

The interface 20 includes a DVI (Digital Visual Interface) terminal 21 and an HDMI (High-Definition Multimedia Interface, registered trademark) terminal 22 for serial communication in accordance with the TMDS (Transition Minimized Differential Signaling) method, a LAN terminal 23, an RS232C terminal 24, and other terminals for communication in accordance with TCP (Transmission Control Protocol), UDP (User Datagram Protocol), or other communication protocols, and a display port terminal (not illustrated), for example.

The interface 20 transmits/receives data to/from an external device (peripheral device) connected to the DVI terminal 21, the HDMI (registered trademark) terminal 22, the display port terminal, the LAN terminal 23, the RS232C terminal 24, or other terminals in accordance with an instruction given by an integrated control unit 31 of the control unit 25 described below. The interface 20 may further include a USB terminal and an IEEE1394 terminal.

The storage unit 26 is an information storage device, such as a hard disk or a semiconductor memory, and stores various types of data processed by the control unit 25. The control unit (image processing device, control device) 25 is a computer or a control circuit that controls the display device 10, and includes the integrated control unit 31, an image data processing unit 32, a sound signal processing unit 33, a panel controller 34, a calibration processing unit 35, and an unevenness correction unit 36.

The integrated control unit 31 is a block that controls each hardware unit of the display device 10 in an integrated manner. The image data processing unit 32 is a block that, when image data (data of an image to be displayed on the display unit 14) is input from an external device via the interface 20, performs a predetermined process on the image data. Note that image data processed in this embodiment is 8-bit digital data and indicates a pixel value (0 to 255) for each of the color components, namely, R (red), G (green), and B (blue). As the pixel value decreases, the brightness decreases (the luminance decreases), and as the pixel value increases, the brightness increases (the luminance increases). The sound signal processing unit 33 is a block that performs a predetermined process on a sound signal (a signal of a sound to be output from a speaker of the display unit 14) input from an external device via the interface 20.

The calibration processing unit 35 is a block that calculates, for each pixel, adjustment values for color unevenness correction (values by which an adjustment is made) and creates a color unevenness correction table that includes the adjustment values for each pixel. The created color unevenness correction table is stored in the storage unit 26.

The unevenness correction unit (correction unit) 36 is a block that adjusts image data of an image to be displayed on the display unit 14 by using the color unevenness correction table stored in the storage unit 26. Note that the unevenness correction unit 36 may perform processing on image data after the image data processing unit 32 has processed the image data or may perform processing on image data before the image data processing unit 32 processes the image data.

The panel controller 34 controls the display unit 14 to display an image of image data that has been processed by the image data processing unit 32 and by the unevenness correction unit 36 on the display unit 14. The panel controller 34 also controls the display unit 14 to display test images for a calibration process on the display unit 14 in accordance with an instruction given by the system control device 40.

The operation unit 28 is an operation member for a user to input various instructions. The integrated control unit 31 is a block that performs operation control on the display device 10 in accordance with an instruction input from the operation unit 28 or from a remote controller. For example, the integrated control unit 31 determines whether or not to supply power to each hardware unit of the display device 10 in accordance with an operation instruction given by using a power switch included in the operation unit 28.

The display unit (display panel) 14 is, for example, a liquid crystal display (LCD) device, a plasma display panel, or an organic EL display device and displays an image in accordance with control performed by the panel controller 34.

The measuring device 50 is a device that captures an image of a test image displayed on the display screen of the display unit 14 and outputs measured values (measured values, such as XYZ values, for example) of the colors of each pixel of the measuring device 50 obtained in the image capturing as measurement data. Note that a test image is an image in which the input pixel value of each color component is set to the same value for all pixels. For example, a test image in which the RGB values are (255, 0, 0) for all pixels is a red test image.

As the measuring device 50, a surface luminance meter, such as a luminance/chromaticity measuring device from Topcon (UA-1000A, for example) or a two-dimensional luminance colorimeter from Konica Minolta (CA-2000, for example), a high-definition digital camera from Nikon or Sony, for example, or an industrial camera can be used.

The measuring device 50 includes an input/output terminal, such as a USB (Universal Serial Bus) terminal, and is connected to the system control device 40 via the input/output terminal so as to enable communication.

The system control device 40 is a control device that controls the display device 10 and the measuring device 50 to perform a calibration process. As the system control device 40, a general-purpose personal computer that includes a processor and a storage unit is used, for example.

The system control device 40 is connected to the measuring device 50 so as to enable communication as described above and is also connected to the display device 10 via an RS232C terminal, for example, so as to enable communication. Further, an application for communicating with the display device 10 and the measuring device 50 to control these devices is installed on the system control device 40.

When an operator inputs a calibration process instruction to the system control device 40, the system control device 40 displays a test image on the display device 10 and transmits a measurement request to the measuring device 50. When receiving the measurement request, the measuring device 50 captures an image of the test image displayed on the display device 10 and transmits measurement data to the system control device 40. The system control device 40 stores the measurement data. After storing the measurement data, the system control device 40 switches the test image to be displayed on the display device 10. For example, a red test image in which the RGB values are (255, 0, 0) for all pixels is displayed, and measurement data for the red test image is stored. Thereafter, the test image is switched and a green test image in which the RGB values are (0, 255, 0) for all pixels is displayed.

Thereafter, the series of operations, namely, "image capturing", "transmission", "storing", and "test image switching", described above is repeatedly performed. As soon as the series of operations is completed for all test images that are used in a calibration process, the system control device 40 ends measurement using the measuring device 50. When measurement using the measuring device 50 ends, the system control device 40 transmits the measurement data and a calibration process instruction to the display device 10.

When receiving the measurement data and the calibration process instruction, the integrated control unit 31 stores the measurement data in the storage unit 26 and causes the calibration processing unit 35 to perform a calibration process.

(Calibration Processing Unit 35)

Now, the calibration processing unit 35 illustrated in FIG. 1 is described. The calibration processing unit 35 is a block that, after measurement of test images displayed on the display unit 14 has been performed by the measuring device 50, receives measurement data obtained in the measurement and performs a calibration process on the basis of the measurement data. In the following description, measurement data obtained from image capturing of one test image is assumed to be one piece of measurement data. That is, one piece of measurement data is a set of data obtained by capturing an image of one test image and is a set of measured values (for example, XYZ values) of each pixel of the measuring device 50.

First, the calibration processing unit 35 performs an extraction process for extracting a pixel area that corresponds to the display screen of the display unit 14 from among all pixels in the measurement data. Note that the calibration processing unit 35 can distinguish the pixel area, which corresponds to the display screen of the display unit 14, by comparing pieces of measurement data obtained from the respective test images with each other and detecting a portion having a color that differs when the respective test images are displayed.

Next, the calibration processing unit 35 performs a size adjustment process (interpolation process) for adjusting the size (the number of pixels) of the measurement data after the extraction process. This process is performed in order to match the number of pixels in the measurement data to the number of pixels of the display screen and to associate each pixel in the measurement data with a corresponding pixel of the display unit 14 on a one-to-one basis. That is, the measured values of each pixel in the measurement data after the size adjustment process corresponds to the measured values of the display colors of a corresponding pixel of the display unit 14. The measured values are values measured by the measuring device 50 or calculated values obtained by interpolating the values measured by the measuring device 50, and tristimulus values (X, Y, Z) are used as the measured values in this embodiment. That is, the measured values of one pixel in the measurement data are formed of an X value, a Y value, and a Z value.

Subsequently, the calibration processing unit 35 calculates adjustment values for color unevenness correction for each pixel of the display unit 14 by using the measurement data after size adjustment and reference data stored in advance. The method for calculating adjustment values is described below.

The reference data is data stored in a ROM (not illustrated) within the display device 10 when the display device 10 is manufactured, and is data used in common by all display devices 10 of the same model. Specifically, the reference data is data that indicates a correspondence between input pixel values (RGB values) and XYZ values (reference values) that are set for the input pixel values as the references, as illustrated in FIG. 2.

The reference data is created as follows. First, one or several reference machines are selected from among a plurality of the display devices 10 of the same model manufactured in large quantities in a factory, and a measuring instrument that serves as the reference (reference measuring instrument) is specified. Next, a predetermined number (729 in the example case illustrated in FIG. 2) of test images are sequentially displayed on the reference machines, and measurement is performed on each of the test images by using the reference measuring instrument. Then, reference values are calculated from measurement data obtained from each of the test images, and a correspondence between the input pixel values (RGB values) of each test image and the reference values (XYZ values) calculated from the measurement data obtained form the test image is created as the reference data. That is, the reference data is data that indicates a correspondence between the input pixel values and the reference values for each of the plurality of test images (see FIG. 2).

Note that various methods are available for calculating each reference value from measurement data. For example, the average of measured values of pixels included in a center portion of the display screen (a portion that includes the center pixel and that covers 20% of the entire display area, for example) may be used as the reference value, the average of measured values of pixels at a plurality of predetermined points may be used as the reference value, or the maximum value, the minimum value, or the average of measured values of all pixels may be used as the reference value.

(Method for Calculating Adjustment Values)

Now, the method for calculating adjustment values for color unevenness correction is described. As described above, in the case where image data is 8-bit data (the pixel value is between 0 and 255), the reference data that indicates XYZ values (reference values) corresponding to each of the all sets of R, G, and B values that can be obtained by combining nine pixel values of 0, 32, 64, 96, 128, 160, 192, 224, and 255 (9×9×9=729 sets) is retained in the display device 10 (see FIG. 2). However, the number of pixel values or the numerical values are not limited to those described above.

Figure 3:
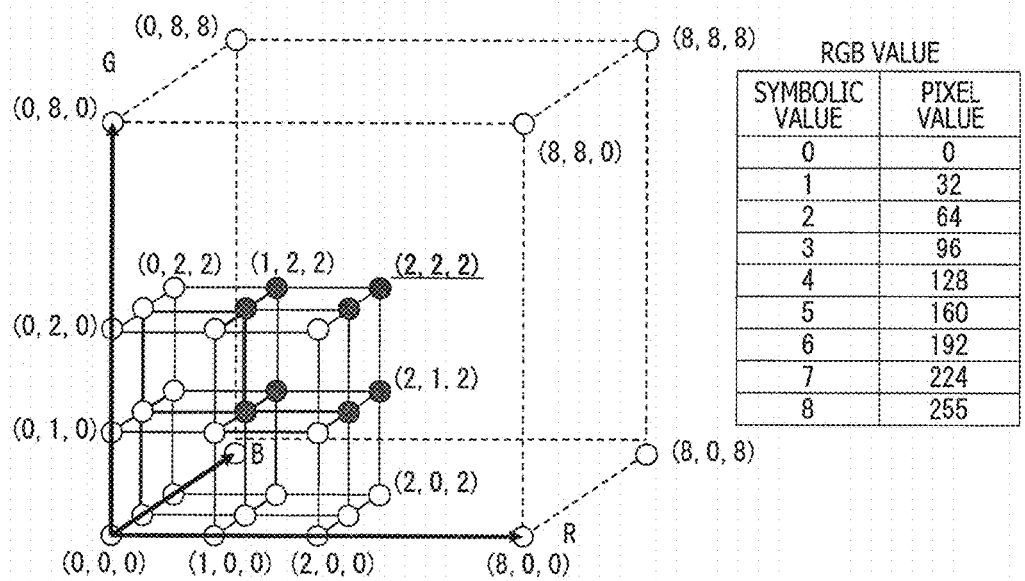
FIG. 3 is a schematic diagram illustrating a color space in which sets of RGB values indicated by the reference data are respectively represented as lattice points.

Here, FIG. 3 illustrates an RGB color space in which the sets of RGB values indicated by the reference data are respectively represented as lattice points. That is, this color space is constituted by 729 lattice points and 512 unit lattices. Note that the values indicated at each lattice point in the color space in FIG. 3 are symbolic values, and relationships between the symbolic values at each lattice point and the pixel values are as indicated in the table in FIG. 3 (the same applies to FIG. 6). In FIG. 3, lattice points at which at least one of the RGB values is any one of 96 to 224 are actually present but are omitted for convenience sake.

In this embodiment, it is assumed that, in measurement using the measuring device 50, test images are displayed and measured for all sets of RGB values that can be obtained by combining the pixel values 32, 128, and 224 (3×3×3=27 sets). That is, it is supposed that, for each of the sets of RGB values (32, 32, 32), (32, 32, 128), (32, 32, 224), . . . , and (224, 224, 224), the test image is displayed, the XYZ values are measured, and measurement data is generated.

A process for calculating, for each pixel, adjustment values for color unevenness correction from measurement data obtained from a test image having RGB values (224, 224, 224), for example, is described below (that is, a process for calculating, for each pixel, adjustment values in a case of input pixel values (224, 224, 224) is described).

In a case where color unevenness occurs among pixels of the display unit 14, when XYZ values (measured values) of each pixel in measurement data obtained from the test image having RGB values (224, 224, 224) are converted to RGB values by using a conversion matrix, differences exist between the converted values and (224, 224, 224). The differences are values to be adjusted.

For example reference values (XYZ values) corresponding to RGB values (224, 224, 224) are (557.9, 562.1, 843.3), and reference values corresponding to RGB values (192, 192, 192) are (405.7, 406.8, 620.1) (see FIG. 2).

Figure 4:
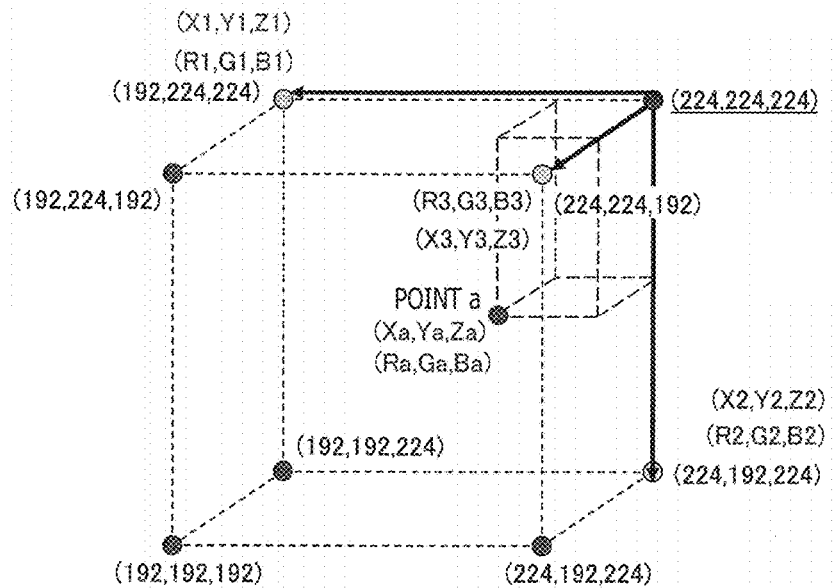
FIG. 4 is a schematic diagram illustrating a unit lattice that belongs to the color space illustrated in FIG. 3 and that includes a lattice point (192, 192, 192) and a lattice point (224, 224, 224).

Then, if measured values for a pixel in measurement data obtained in a case of displaying and measuring the test image having RGB values (224, 224, 224) satisfy (405.7≤X≤557.9, 406.8≤Y≤562.1, 620.1≤Z≤843.3), a point A that represents the measured values (Xa, Ya, Za) for the pixel is located within a unit lattice that includes the lattice point (224, 224, 224) and the lattice point (192, 192, 192) in the color space in FIG. 3 (see FIG. 4). Here, RGB values corresponding to (Xa, Ya, Za) are calculated as (Ra, Ga, Ba), and the RGB values (224, 224, 224) of the test image are assumed to correspond to the reference point. Then, the difference between the reference point and (Ra, Ga, Ba) corresponds to the adjustment values, which are expressed as follows.

Adjustment value for $R = 224 - Ra$        expression D1

Adjustment value for $G = 224 - Ga$        expression D2

Adjustment value for $B = 224 - Ba$        expression D3

Calculation of (Ra, Ga, Ba) that corresponds to (Xa, Ya, Za) can be performed by using a 3×3 matrix as expressed by expression 1.

[Math. 1]

$$\begin{pmatrix} R \\ G \\ B \end{pmatrix} = \begin{pmatrix} a & b & c \\ d & e & f \\ g & h & i \end{pmatrix} \cdot \begin{pmatrix} X \\ Y \\ Z \end{pmatrix} \quad \text{expression 1}$$

Here, as the coefficients a to i in the matrix in expression 1, values defined by the standard of sRGB, AdobeRGB, CIE RGB, or other systems may be used; however, accurate conversion might not be performed depending on the properties of the individual display device 10. Therefore, if the coefficients a to i are calculated by referring to the reference data that corresponds to the model of the display device 10 for which a calibration process is performed, conversion appropriate to the properties of the individual display device can be performed. Specifically, if three sets of RGB values and XYZ values in the reference data are used, the coefficients a to i can be calculated by assuming expression 2.

[Math. 2]

$$\begin{pmatrix} R1 & R2 & R3 \\ G1 & G2 & G3 \\ B1 & B2 & B3 \end{pmatrix} = \begin{pmatrix} a & b & c \\ d & e & f \\ g & h & i \end{pmatrix} \cdot \begin{pmatrix} X1 & X2 & X3 \\ Y1 & Y2 & Y3 \\ Z1 & Z2 & Z3 \end{pmatrix} \quad \text{expression 2}$$

Here, expression 2 is modified to expression 3 below in order to calculate the coefficients a to i.

$$\begin{pmatrix} a & b & c \\ d & e & f \\ g & h & i \end{pmatrix} = \begin{pmatrix} R1 & R2 & R3 \\ G1 & G2 & G3 \\ B1 & B2 & B3 \end{pmatrix} \cdot \begin{pmatrix} X1 & X2 & X3 \\ Y1 & Y2 & Y3 \\ Z1 & Z2 & Z3 \end{pmatrix}^{-1} \quad \text{expression 3}$$

In expression 2 or expression 3, the reference values in a case of RGB values (R1, G1, B1) are represented by (X1, Y1, Z1), the reference values in a case of RGB values (R2, G2, B2) are represented by (X2, Y2, Z2), and the reference values in a case of RGB values (R3, G3, B3) are represented by (X3, Y3, Z3). As illustrated in FIG. 4, in the unit lattice that includes the point A that represents (Xa, Ya, Za), three lattice points that are adjacent to the reference point (224, 224, 224), which represents the RGB values of the test image, are used as (R1, G1, B1) to (R3, G3, B3).

That is, (R1, G1, B1)=(192, 224, 224), (R2, G2, B2)= (224, 192, 224), and (R3, G3, B3)=(224, 224, 192) are illustrated in FIG. 4.

Then, the values (R1, G1, B1) to (R3, G3, B3) are substituted into expression 3, and the values (X1, Y1, Z1) to (X3, Y3, Z3) corresponding to (R1, G1, B1) to (R3, G3, B3) are read from the reference data in FIG. 2 and are substituted into expression 3. Accordingly, the coefficients a to i are calculated.

The calculated coefficients are substituted into expression 1, and the measured values (X, Y, Z) obtained when the test image having RGB values (224, 224, 224) is measured are substituted into expression 1. As a result, (Ra, Ga, Ba) in FIG. 4 are calculated, and Ra, Ga, and Ba are respectively substituted into expressions D1 to D3 described above to thereby calculate the adjustment values.

That is, with the procedure described above, a unit lattice in the color space illustrated in FIG. 3 that includes the measured values in the measurement data obtained in a case of displaying and measuring a test image is detected. In the detected unit lattice, the RGB values and the XYZ values of each of the three lattice points that are adjacent to the lattice point that represents the RGB values of the test image are read from the reference data, and the coefficients of the conversion matrix are calculated from these values. Then, the measured values are converted to RGB values by using the conversion matrix, and the differences between the RGB values of the test image and the RGB values obtained as a result of conversion are calculated as the adjustment values.

Note that a unit lattice that includes measured values (X, Y, Z) is detected as follows. First, for each unit lattice that belongs to the color space illustrated in FIG. 3, a combination of the smallest RGB values ($R_{min}$, $G_{min}$, $B_{min}$), a combination of the largest RGB values ($R_{max}$, $G_{max}$, $B_{max}$), reference values ($X_{min}$, $Y_{min}$, $Z_{min}$) in the reference data that correspond to ($R_{min}$, $G_{min}$, $B_{min}$), and reference values ($X_{max}$, $Y_{max}$, $Z_{max}$) in the reference data that correspond to ($R_{max}$, $G_{max}$, $B_{max}$) are calculated or stored in advance in the storage unit 26. Then, a unit lattice that satisfies relationships ($X_{min} \leq X \leq X_{max}$, $Y_{min} \leq Y \leq Y_{max}$, $Z_{min} \leq Z \leq Z_{max}$) is detected as the unit lattice that includes the measured values (X, Y, Z).

By performing the procedure described above, adjustment values in a case where the RGB values (224, 224, 224) of the test image are assumed to be input pixel values can be calculated for each pixel. For the remaining 26 test images other than the test image having RGB values (224, 224, 224), adjustment values are calculated in a similar manner.

Accordingly, for the 27 sets of input pixel values respectively corresponding to the sets of RGB values (32, 32, 32), (32, 32, 128), (32, 32, 224), . . . , and (224, 224, 224), the adjustment values are calculated for each pixel.

The calibration processing unit 35 creates, for each pixel, adjustment value information that indicates adjustment values for each of the 27 sets of input pixel values, as illustrated in FIG. 5A. FIG. 5A illustrates adjustment value information for one pixel. The calibration processing unit 35 creates a color unevenness correction table that includes adjustment value information as illustrated in FIG. 5A for all pixels and stores the color unevenness correction table in the storage unit 26. That is, the information illustrated in FIG. 5A is adjustment value information for one pixel, and adjustment value information as illustrated in FIG. 5A is stored in the storage unit 26 for the number of pixels of the display unit 14.

(Color Unevenness Correction Using Color Unevenness Correction Table)

When receiving image data of an image to be displayed on the display unit 14, the unevenness correction unit 36 performs color unevenness correction for the RGB values of each pixel by using the color unevenness correction table. Color unevenness correction using the color unevenness correction table is described below. The example in which adjustment values are calculated for each pixel for the 27 sets of RGB values obtained by combining 32, 128, and 224 has been described above (see FIG. 5A). In the following description, a case is assumed where adjustment values are calculated for each pixel for 27 sets of RGB values obtained by combining 0, 128, and 255 and a color unevenness correction table is created therefrom, for convenience of description. That is, as illustrated in FIG. 5B, adjustment values are calculated for one pixel for 27 sets of input pixel values, namely, (0, 0, 0), (0, 0, 128), (0, 0, 255), . . . , (255, 255, 255), and a color unevenness correction table that includes such adjustment values for each pixel is retained in the storage unit 26.

FIG. 6 illustrates an RGB color space in which the 27 sets of RGB values for which adjustment values are indicated in the color unevenness correction table are respectively represented by lattice points. In a case of performing a color unevenness correction process on the set of RGB values that corresponds to each lattice point illustrated in FIG. 6, adjustment values that are associated with the set of RGB values in the color unevenness correction table are read, and the pixel values are adjusted by using the adjustment values to thereby perform color unevenness correction.

Meanwhile, in a case of performing a color unevenness correction process on a set of RGB values other than the sets of RGB values respectively corresponding to the 27 lattice points in FIG. 6 (that is, in a case of performing a color unevenness correction process on a set of RGB values other than the sets of RGB values included in the color unevenness correction table), lattice points around the position that represents the set of RGB values to be adjusted are detected in the color space in FIG. 6, and interpolation is performed by using the adjustment values for the detected lattice points to thereby calculate adjustment values for the set of RGB values to be adjusted and adjust the pixel values by using the adjustment values. That is, for a set of RGB values for which adjustment values are not included in the color unevenness correction table, the adjustment values are calculated by performing interpolation using the adjustment values included in the color unevenness correction table. As the method of interpolation in this case, linear interpolation, spline interpolation, or tetrahedral interpolation, for example, can be used.

(Mode Selection)

The unevenness correction unit 36 according to this embodiment selects one mode from among a high-luminance mode, a luminance-unevenness-suppression-preferred mode, and an intermediate mode and performs the color unevenness correction process so that the degree of associated luminance unevenness suppression over the entire display screen changes in accordance with the mode, which is described in detail below.

Color unevenness correction (a form in which only color unevenness correction is simply performed without mode selection described below) is originally performed mainly for suppressing color unevenness among pixels caused by variations in the specifications of the pixels. Luminance unevenness suppression is originally performed in luminance unevenness correction. Therefore, color unevenness correction is originally performed so as to basically not affect the luminance components as much as possible. For example, an adjustment for changing R, G, and B components by "+10, +8, +9", for example, is not made. In such a case, an adjustment is made so as to change the R, G, and B components by "+1, −1, 0", for example, to correct color unevenness while suppressing changes in the luminance components as much as possible (note that, even if color unevenness correction is performed without luminance unevenness correction, an effect of associated luminance unevenness suppression is produced in association with color unevenness suppression).

Now, luminance unevenness is described. In a case where the specified luminance of a display device for signage or information display, for example, which requires high luminance, is 700 cd/m$^2$, for example, the value 700 cd/m$^2$ does not indicate the luminance at every position on the display screen but indicates the luminance of the center portion of the display screen, and the luminance of the edge portion of the display screen (a portion of the display screen in the vicinity of the bezel) may be lower than that of the center portion. The reasons are as follows.

In a case of using LEDs as the backlights, as illustrated in FIG. 9, one LED is often disposed per several tens to several hundreds pixels instead of disposing one LED per pixel. Due to such a display structure and the properties of the LED backlights, in the center portion of the display screen, backlights are present in all directions in the circumference of the center portion, as illustrated in FIG. 9, and therefore, LEDs adjacent to each other complementarily emit light to each other to eliminate a drop in the luminance. On the other hand, in the edge portion of the display screen, backlights are not present outside the display screen, and therefore, a drop in the luminance tends to occur unlike in the center portion. Accordingly, the display device is usually configured to perform luminance unevenness correction for suppressing the luminance of the center portion so as to make the luminance of the center portion of the display screen closer to the luminance of the edge portion. That is, the luminance (brightness) of the entire display screen is intentionally decreased to suppress the luminance difference (luminance unevenness) between the center portion and the edge portion.

Meanwhile, in the case of signage or information display, a need to make a display image easily visible even if the surroundings are bright or a need to make a display image easily visible to a person far away exists, and therefore, it is desirable to perform display at high luminance to the extent possible. However, in luminance unevenness correction, an adjustment is made so as to make the luminance of a bright portion closer to the luminance of a dark portion. Therefore, maintaining the luminance of the entire display screen at a high level has a trade-off relationship with completely eliminating luminance unevenness and making the entire display screen uniform.

Meanwhile, if the ratio of the luminance of the edge portion of the display screen relative to the luminance of the center portion thereof in a case of displaying an image having uniform pixel values is equal to or larger than a predetermined ratio (for example, 90%), a drop in the luminance of the edge portion of the display screen, if any, is not so noticeable, which depends on the specifications of the display device though (see FIG. 10B).

Accordingly, some display devices for signage or information display are configured so as to intentionally not perform luminance unevenness correction for making the luminance of the center portion of the display screen closer to the luminance of the edge portion (or so as to perform luminance unevenness correction to some extent while leaving luminance unevenness as is to a certain degree) and so as to perform color unevenness correction. With such a configuration, luminance unevenness is left to a certain degree but is not so noticeable for use, and the luminance (brightness) of the entire display screen can be maintained at a high level. Because of such reasons, in the case where the specified luminance of a display device for signage or information display is, for example, 700 cd/m$^2$, the value 700 cd/m$^2$ does not indicate the luminance at every position on the display screen but indicates the luminance of the center portion of the display screen, and the luminance of the edge portion of the display screen may be lower than that of the center portion.

If a single display device that is designed for signage or information display as described above is used, luminance unevenness is not noticeable. However, if such a display device is used as a display device that constitutes a multi-display, luminance unevenness becomes noticeable and tends to be easily perceived. This is because the degree of a drop in the luminance differs between display devices adjacent to each other, or the display screen edge portion, which is not so closely watched in a case of a single display device, is watched closely in a case where one image is displayed by using a plurality of display devices.

That is, in a case of using a display device that is designed for signage (a display device configured such that the luminance of the edge portion of the display unit is lower than that in the center portion) as part of a multi-display, the degree of luminance unevenness suppression needs to be further increased than in a case of using such a display device for other uses.

Here, the display device 10 according to this embodiment does not employ a configuration in which luminance unevenness correction is performed for each pixel in addition to color unevenness correction and employs a configuration in which the mode of the unevenness correction unit 35, which performs color unevenness correction, is selected from among the high-luminance mode, the luminance-unevenness-suppression-preferred mode, and the intermediate mode to thereby change the degree of luminance unevenness suppression associated with color unevenness suppression in accordance with the mode.

Specifically, the display device 10 according to this embodiment has three modes, namely, the high-luminance mode in which the luminance is high and the degree of luminance unevenness suppression is low, the luminance-unevenness-suppression-preferred mode in which the luminance is low and the degree of luminance unevenness suppression is high, and the intermediate mode, which is a mode between the high-luminance mode and the luminance-unevenness-suppression-preferred mode (the luminance of the entire screen is lower than that in the high-luminance mode and higher than that in the luminance-unevenness-suppression-preferred mode, and the degree of associated luminance unevenness suppression is higher than that in the high-luminance mode and lower than that in the luminance-unevenness-suppression-preferred mode). The integrated control unit (selection unit) 31 sets one of the three modes in accordance with an instruction input by the user (the set mode is selected). Accordingly, the degree of associated luminance unevenness suppression is changed in accordance with the use by selecting the mode.

Figure 11:
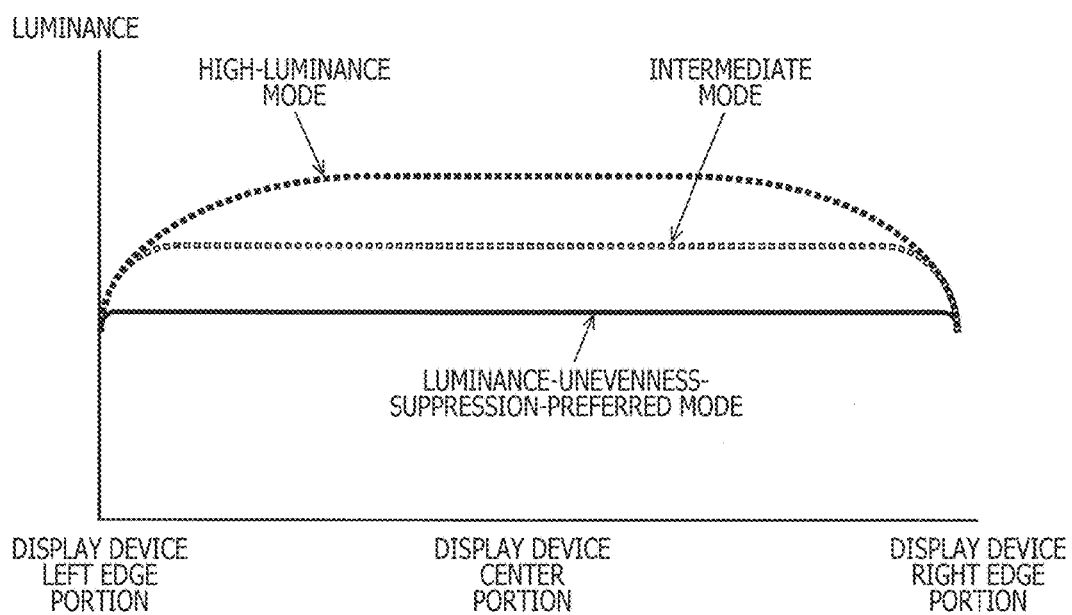
FIG. 11 is a diagram illustrating, for each mode, a luminance distribution of the display device in a case where a uniform image is displayed, where the vertical axis represents the luminance, and the horizontal axis represents the position on the display screen.
Figure 12:
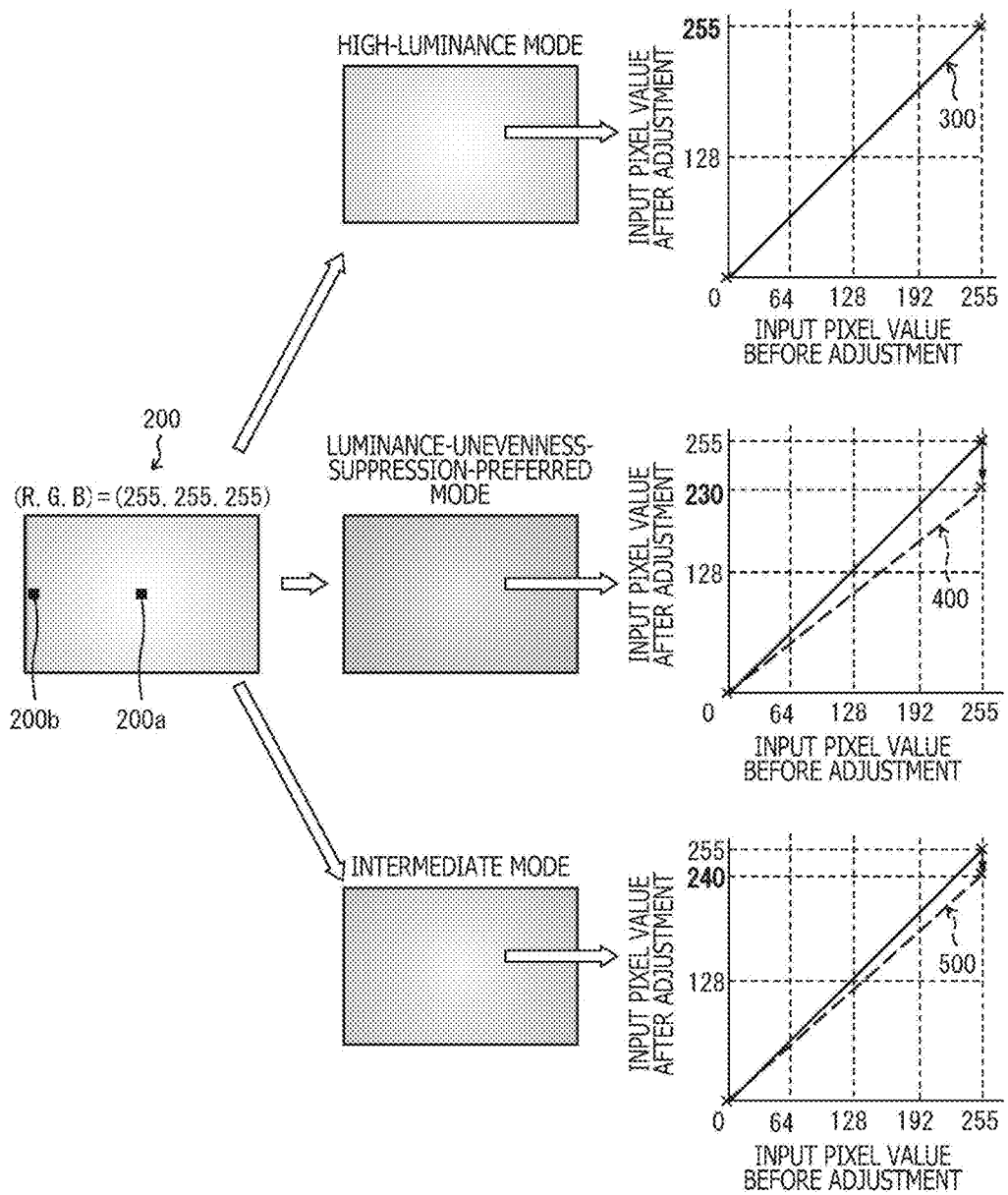
FIG. 12 is a diagram in which the degrees of luminance unevenness suppression in the respective modes are compared with each other.

Now, the modes are described in detail with reference to FIG. 11 and FIG. 12. FIG. 11 is a diagram illustrating, for each mode, a luminance distribution of the display device in a case where a uniform image is displayed, where the vertical axis represents the luminance (measured value), and the horizontal axis represents the position on the display screen. FIG. 12 is an explanatory diagram in which the degrees of associated luminance suppression in the respective modes are compared with each other.

The luminance-unevenness-suppression-preferred mode is a mode in which the unevenness correction unit 36 performs a pixel value limitation process for uniformly shifting, for each pixel, the pixel value (input pixel value) of each color component before color unevenness correction to a lower pixel value, and thereafter, color unevenness correction is performed by using the color unevenness correction table calculated in advance (note that, in this embodiment, the brightness decreases as the pixel value decreases).

The high-luminance mode is a mode in which the unevenness correction unit 36 does not perform the pixel value limitation process, which is performed in the luminance-unevenness-suppression-preferred mode, and performs a color unevenness correction process by using the color unevenness correction table.

The intermediate mode is a mode in which the unevenness correction unit 36 performs the pixel value limitation process, and thereafter, performs color unevenness correction by using the color unevenness correction table calculated in advance, and in which the degree of the shift (degree of adjustment) in the pixel value limitation process is made lower than that in the luminance-unevenness-suppression-preferred mode.

Now, the reasons why the above-described pixel value limitation process is performed are described. The reference numeral 200 in FIG. 12 indicates a schematically illustrated display screen in a case where the light emission luminance of the backlights is maximized and a uniform image in which the RGB values of all pixels are set to (255, 255, 255) is displayed. It is assumed for the display screen indicated by the reference numeral 200 in FIG. 12 that, even in the case of the maximum pixel values (255, 255, 255), pixels in the left edge portion are approximately at a luminance level that is attained when pixels in the center portion have RGB values (230, 230, 230).

In order to make the luminance level of the pixel 200*b* in the edge portion and that of the pixel 200*a* in the center portion close to each other on the display screen indicated by the reference numeral 200 in FIG. 12, a method can be used in which luminance unevenness correction is performed for each pixel or for each block constituted by a plurality of pixels in addition to color unevenness correction. However, if mode selection is performed in the method, a table that includes adjustment values for luminance unevenness correction for each pixel or for each block needs to be stored for each mode, which increases the load of the computer (a table that includes adjustment values for each pixel has a large information volume, and storing such a table for each mode results in an increased load of the computer).

Here, the inventors of the present invention have found that, in a case where the pixel value limitation process (for example, a pixel value adjustment indicated by the reference numeral 400 in FIG. 12) for uniformly shifting, for all pixels, the input pixel value of each color component to a lower pixel value (limiting the range within which each input pixel value falls) is performed, and thereafter, color unevenness correction is performed, if the degree of the shift in the pixel value limitation process is changed (the range within which each input pixel value falls is changed, that is, a change from the pixel value adjustment indicated by the reference numeral 400 to that indicated by the reference numeral 500 in FIG. 12 is made to occur, for example), an effect of associated luminance unevenness suppression produced in association with color unevenness correction changes. Specifically, the inventors of the present invention have found that, in a case where the degree of the shift in the pixel value limitation process is zero (that is, the pixel value limitation process is not performed (in a case where the range within which each input pixel value falls is not limited)), the luminance of the entire screen is high, and therefore, the effect of associated luminance unevenness suppression produced in association with color unevenness correction is not significant, but as the degree of the shift in the pixel value limitation process increases (the range within which each input pixel value falls becomes narrow), the luminance of the entire screen decreases and the effect of associated luminance unevenness suppression produced in association with color unevenness correction becomes significant.

Accordingly, in this embodiment, the degree (the degree of adjustment) of the pixel value limitation process is changed (the range within which each input pixel value falls is changed) by mode selection to thereby vary the effect of associated luminance unevenness suppression produced in association with color unevenness correction by mode selection. In doing so, the degree of luminance unevenness suppression can be changed in accordance with mode selection without increasing the load of the computer. The reasons why the load of the computer does not increase are as follows.

If the input pixel values are the same for all pixels (as indicated by the reference numeral 200 in FIG. 12), the same pixel value adjustment values are uniformly applied to all pixels, and therefore, the pixel value limitation process described above can be implemented as long as input pixel value conversion information (a parameter, for example) common to all pixels is prepared. The input pixel value conversion information common to all pixels has a small information volume, and therefore, even if such input pixel value conversion information is prepared for each mode, the load of the computer does not increase so much.

That is, according to the configuration of this embodiment, although the color unevenness correction table (color unevenness table with a large amount of data) that includes color unevenness adjustment values for each pixel or for each group needs to be stored, the color unevenness correction table can be used in common in the modes, and it is not necessary to store different color unevenness correction tables for the respective modes. Although the input pixel value conversion information having a low amount of data needs to be stored for each mode, a luminance unevenness correction table (having a large amount of data) that includes luminance unevenness adjustment values for each pixel or for each group is not necessary. Therefore, the load of the computer can be made lower than that in the case where the method in which the degree of luminance unevenness correction for each pixel is changed in accordance with mode selection.

Now, the pixel value limitation process in each of the luminance-unevenness-suppression-preferred mode and the intermediate mode is specifically described.

It is assumed that, in the case where a uniform image in which all of the RGB values have the maximum pixel value is displayed as in the display screen indicated by the reference numeral 200 in FIG. 12, the luminance level of the pixel 200b in the darkest edge portion is approximately at a luminance level that is attained when the pixel 200a in the brightest center portion has RGB values (230, 230, 230).

Here, in the luminance-unevenness-suppression-preferred mode, if the maximum pixel value (255) is input, conversion to the pixel value (230) of the pixel 200a that corresponds to the luminance level of the pixel 200b having the maximum pixel value is performed for each color component. That is, for all pixels, the pixel value of each color component is converted from 255 to 230.

More specifically, the pixel value limitation process in the luminance-unevenness-suppression-preferred mode is performed as follows. First, in the storage unit 26, data indicating a post-adjustment input pixel value (230) that is applied to the maximum pixel value (255) in the pixel value limitation process in the luminance-unevenness-suppression-preferred mode is stored in advance for each color component (note that the post-adjustment input pixel value to be applied to the maximum pixel value is calculated from measured values, which is described in detail below).

In this embodiment, in the pixel value limitation process in the luminance-unevenness-suppression-preferred mode, the maximum pixel value is adjusted from 255 to 230, and therefore, the value 230 is stored as the post-adjustment input pixel value (hereinafter simply referred to as "post-adjustment pixel value") that corresponds to the maximum pixel value.

The unevenness correction unit 36 reads the post-adjustment pixel value that corresponds to the maximum pixel value for each color component in the luminance-unevenness-suppression-preferred mode and performs linear interpolation between the minimum pixel value (0) and the post-adjustment pixel value (230) that corresponds to the maximum pixel value to thereby calculate post-adjustment pixel values for all input pixel values. Accordingly, the pixel value limitation process can be performed (that is, the post-adjustment pixel value that corresponds to the maximum pixel value corresponds to the "input pixel value conversion information common to all pixels" described above).

Note that the following method may be used instead of the method in which the post-adjustment pixel value corresponding to the maximum pixel value is stored in advance. A coefficient (230/255 (≅0.902)) obtained by dividing the value of the maximum pixel value after an adjustment by that before the adjustment may be stored, and post-adjustment pixel values for all input pixel values may be calculated on the basis of the coefficient (in this case, the coefficient corresponds to the "input pixel value conversion information common to all pixels" described above). Alternatively, a conversion table in which the input pixel values after an adjustment (0 to 230) are associated with the input pixel values before the adjustment (0 to 255) may be stored in advance in the storage unit 26 (in this case, the conversion table corresponds to the "input pixel value conversion information common to all pixels" described above).

Accordingly, the pixel value limitation process for uniformly shifting, for each pixel, input pixel values to lower pixel values can be implemented. The unevenness correction unit 36 performs the pixel value limitation process in this manner, and thereafter, performs color unevenness correction by referring to the color unevenness correction table.

Now, the intermediate mode is described. In the intermediate mode, although the pixel value adjustment width in the pixel value limitation process is not as wide as that in the luminance-unevenness-suppression-preferred mode, the pixel value limitation process is performed, and thereafter, color unevenness correction is performed. That is, the range within which each input pixel value falls in the intermediate mode is made narrower than that in the high-luminance mode and wider than that in the luminance-unevenness-suppression-preferred mode.

Specifically, the pixel value limitation process in the intermediate mode is performed as follows. First, in the storage unit 26, data indicating a post-adjustment pixel value that is applied to the maximum pixel value in the pixel value limitation process in the intermediate mode is stored in advance for each color component. In the intermediate mode, the post-adjustment pixel value that is applied to the maximum pixel value is set to a value higher than the post-adjustment pixel value (230) that is applied to the maximum pixel value in the luminance-unevenness-suppression-preferred mode and lower than the maximum pixel value (255) in the high-luminance mode in which the pixel value limitation process is not performed. Here, it is assumed that the post-adjustment pixel value that corresponds to the maximum pixel value in the intermediate mode is set to 240 for all color components. Then, the unevenness correction unit 36 reads the post-adjustment pixel value that corresponds to the maximum pixel value from the storage unit 26 for each color component and performs linear interpolation between the minimum pixel value (0) and the post-adjustment pixel value (240) that corresponds to the maximum pixel value to thereby obtain a function (a coefficient that represents the slope) indicated by the reference numeral 500 in FIG. 12 and adjust the input pixel values by using the function. In this way, the pixel value limitation process is performed. Note that, also in the intermediate mode, a coefficient or a conversion table may be stored in advance as in the luminance-unevenness-suppression-preferred mode instead of storing the post-adjustment pixel value that corresponds to the maximum pixel value. The unevenness correction unit 36 performs the pixel value limitation process in this manner, and thereafter, performs color unevenness correction by referring to the color unevenness correction table.

Note that, in the high-luminance mode, the color unevenness correction process is performed by using the color unevenness correction table without performing the pixel value limitation process, which is performed in the luminance-unevenness-suppression-preferred mode and in the intermediate mode. That is, in the high-luminance mode, the unevenness correction unit 36 performs color unevenness correction using the color unevenness correction table without performing the pixel value limitation process on the input pixel values, as represented by the function indicated by the reference numeral 300 in FIG. 12.

Figure 13:
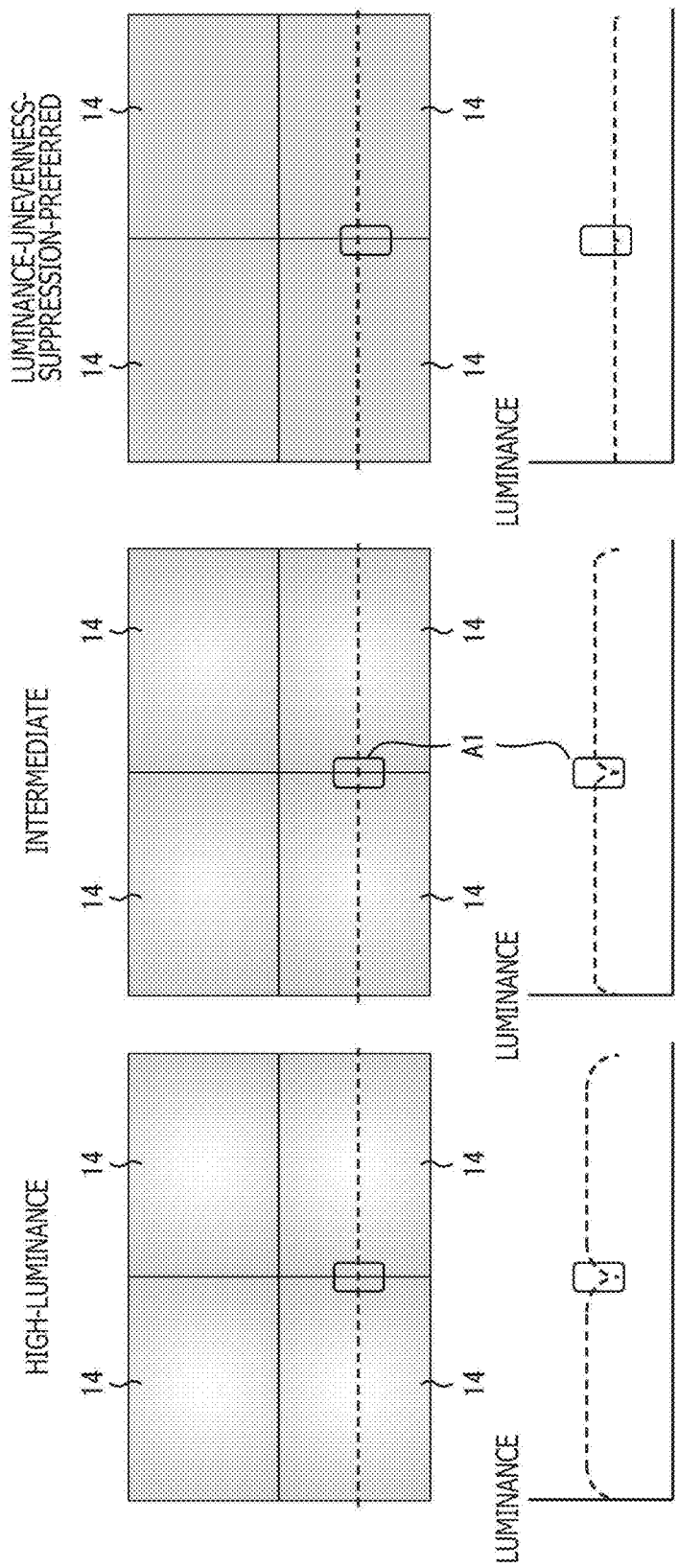
FIG. 13 is a diagram schematically illustrating a display screen and a luminance distribution in a case where a uniform image is displayed in each mode on a multi-display formed by arranging the display devices according to the embodiment.

Now, the characteristics of each mode are described. As illustrated in FIG. 11, in the high-luminance mode, the luminance of the center portion of the display screen of the display unit 14 can be maintained at a high level; however, the luminance of the edge portion is lower than the luminance of the center portion. Therefore, if the high-luminance mode is applied to a multi-display, a drop in the luminance tends to be easily perceived in the vicinity of the boundary between display devices, as illustrated in FIG. 13. That is, the high-luminance mode is a mode that is not adequate in terms of the uniformity in the case of using the display devices 10 for a multi-display but is appropriate in the case of using the display device 10 for stand-alone signage.

Meanwhile, in the luminance-unevenness-suppression-preferred mode, the pixel value limitation process is performed, and thereafter, color unevenness correction is performed. Therefore, luminance unevenness in the display unit 14 is suppressed so as to achieve a uniform look, as illustrated in FIG. 11 and FIG. 13. Accordingly, the luminance uniformity is improved, but the luminance of the center portion of the display unit 14 decreases and the luminance of the entire display screen decreases accordingly. That is, the luminance-unevenness-suppression-preferred mode is a mode that is not adequate in the case of using the display device 10 for stand-alone signage because the brightness (luminance) is not sufficient but is appropriate in the case of using the display devices 10 for a multi-display.

The intermediate mode is a mode in which image processing is performed by taking into consideration both the high luminance and the luminance unevenness suppression to a certain degree instead of focusing on only one of the high luminance and the luminance unevenness suppression, as illustrated in FIG. 11 and FIG. 13. That is, in the intermediate mode, display in which the luminance of the display screen is maintained to a certain degree while the luminance uniformity is improved to a certain degree can be achieved.

That is, with the configuration described above, although the luminance of the entire screen decreases as the adjustment width in the pixel value limitation process increases, the effect of luminance unevenness suppression associated with color unevenness correction can be enhanced.

Further, in this embodiment, for each color component, the post-adjustment pixel value that corresponds to the maximum pixel value is set to 230 in the pixel value limitation process in the luminance-unevenness-suppression-preferred mode and is set to 240 in the intermediate mode. An example of the method for setting these values is described below.

It is assumed that, in the case where the light emission luminance of the backlights is maximized and a uniform image in which the RGB values of all pixels are set to (255, 255, 255) is displayed as indicated by the reference numeral 200 in FIG. 12, for example, the measured value of the luminance of the pixel 200a in the center portion, which has the highest luminance among all pixels, is 1000 (cd/m$^2$) and the measured value of the luminance of the pixel 200b in the edge portion, which has the lowest luminance among all pixels, is 902 (cd/m$^2$). Here, RGB pixel values of the pixel 200a with which the luminance of the pixel 200a is identical to the luminance of the pixel 200b are calculated as post-adjustment pixel values. Specifically, supposing that the luminance when the RGB values are (0, 0, 0) is zero and that the measured value and the pixel value have a proportional relation, a post-adjustment pixel value common to all color components can be calculated by using expression 4.

Post-adjustment pixel value=255×(Luminance when edge portion has pixel value 255−Luminance when edge portion has pixel value 0)/(Luminance when center portion has pixel value 255−Luminance when center portion has pixel value 0)  expression 4

When calculation is performed by using expression 4, the result is as follows.

Post-adjustment pixel value=255×(902−0)/(1000−0)=230.01.

The result is rounded to 230, and the post-adjustment pixel value that is applied to the maximum pixel value in the luminance-unevenness-suppression-preferred mode is set to 230 and is stored in the storage unit 26 in association with each color component. Note that the post-adjustment pixel value having a decimal fraction may be stored in the storage unit 26 without rounding the value, the pixel value limitation process may be performed by using the post-adjustment pixel value, color unevenness correction may be performed, and the pixel value after the color unevenness correction may be rounded last.

The post-adjustment pixel value that is applied to the maximum pixel value in the intermediate mode is set to a value lower than the maximum pixel value (255) in the high-luminance mode and higher than the post-adjustment pixel value (230) that is applied to the maximum pixel value in the luminance-unevenness-suppression-preferred mode. For example, the average of the maximum pixel value in the high-luminance mode and the post-adjustment pixel value for the maximum pixel value in the luminance-unevenness-suppression-preferred mode may be set as a corrected value in the intermediate mode (note that, in this embodiment, 240 is set as indicated by the reference numeral 500 in FIG. 12). Note that the corrected value refers to a pixel value (post-adjustment pixel value) obtained as a result of an adjustment.

Calculation of the post-adjustment pixel value described above is performed by the calibration processing unit 35. That is, in the calibration process, the luminance of the display screen is measured by using the measuring device 50 capable of measuring luminance, and the calibration processing unit 35 calculates the post-adjustment pixel value on the basis of the result of measurement and stores the post-adjustment pixel value in the storage unit 26. Subsequently, the unevenness correction unit 36 obtains the function indicated by the reference numeral 400 or 500 in FIG. 12 or a conversion table by performing linear interpolation, for example, using the post-adjustment pixel value stored in the storage unit 26, and performs the pixel value limitation process by using the function or conversion table.

Figure 14:
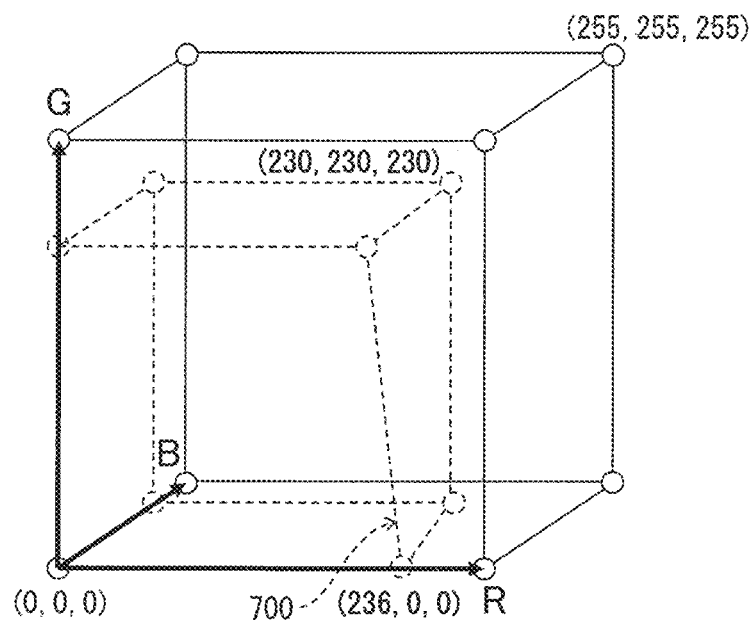
FIG. 14 is a diagram illustrating the range of distribution of RGB values after an adjustment by a pixel value limitation process, in a color space that represents the range of RGB values for which display is possible on the display device.

Note that the post-adjustment pixel value may be calculated from the result of measurement obtained by displaying the uniform image of (R, G, B)=(255, 255, 255) indicated by the reference numeral 200 in FIG. 12, as described above; however, if measured values of an image other than the image of (R, G, B)=(255, 255, 255) are available, the pixel value limitation process may be performed by taking into consideration the measured values. The post-adjustment pixel values of (R, G, B)=(230, 230, 230) are calculated from the result of measurement on (R, G, B)=(255, 255, 255) in the example described above. It is assumed that, in the case of displaying and measuring an image of (R, G, B)=(255, 0, 0), the value 236 is calculated in a similar manner as in the above-described example as the post-adjustment pixel value corresponding to the maximum pixel value of R for adjusting the luminance of the center portion to the luminance of the left edge portion. In this case, the input pixel values for G and B are adjusted by using the function indicated by the reference numeral 400 in FIG. 12, as in the above-described example; however, a function different from the function indicated by the reference numeral 400 in FIG. 12 may be calculated for R by performing linear interpolation between 236, which is the post-adjustment pixel value corresponding to the maximum pixel value, and zero, which is the minimum pixel value. Note that, also in this example, the method in which the post-adjustment pixel value corresponding to the maximum pixel value is stored may be employed or the method in which a coefficient or a conversion table is stored in advance may be employed. The post-adjustment pixel values (RGB values) set in the pixel value limitation process in the luminance-unevenness-suppression-preferred mode in this example are distributed within the range indicated by the reference numeral 700 in the color space illustrated in FIG. 14. Further, a similar process is performed for other colors corresponding to (R, G, B)=(0, 255, 0) and (R, G, B)=(0, 0, 255), for example, to thereby enable more precise calculation of post-adjustment pixel values.

Figure 15:
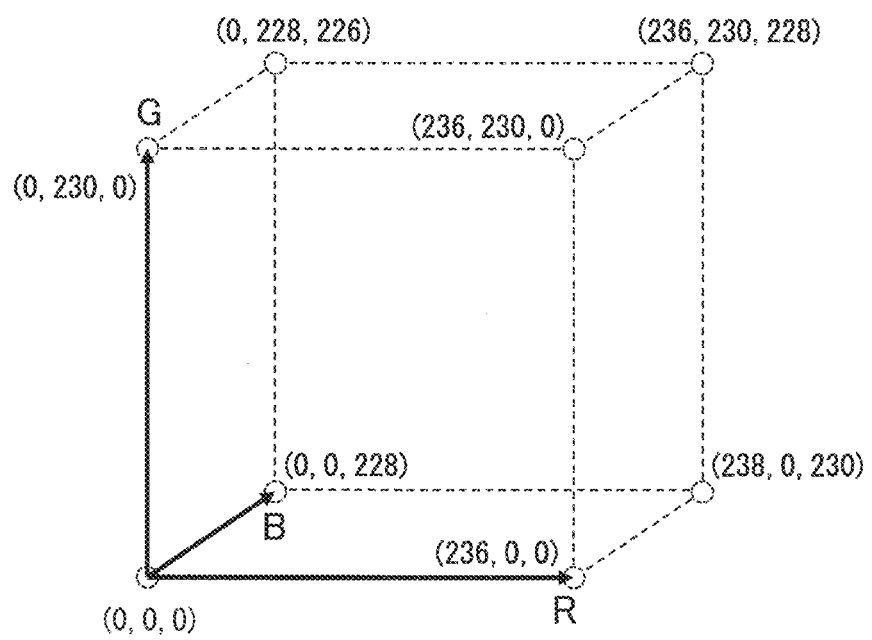
FIG. 15 is a diagram illustrating, as a color space, a possible range of RGB values after an adjustment by the pixel value limitation process.

Alternatively, the luminance value of a test image in which the pixel values of the respective color components are different from each other is measured instead of measuring the luminance value of a test image in which the pixel values of the respective color components are the same. Here, it is assumed that the luminance value when the pixel values of the left edge portion are (255, 255, 255) is equal to the luminance value when the pixel values of the center portion are (236, 230, 228). In this case, the range of the input pixel values from (0, 0, 0) to (255, 255, 255) is adjusted to the range from (0, 0, 0) to (236, 230, 228). Here, an interpolation method, such as linear interpolation, spline interpolation, or tetrahedral interpolation, is used to calculate the combinations of RGB values after an adjustment that correspond to the combinations of RGB values before the adjustment. That is, it is assumed that the input pixel values are converted to the color space defined by eight vertexes, as illustrated in FIG. 15, and lattice points in the color space that respectively indicate the combinations of RGB values after conversion are calculated by using any interpolation method among the various interpolation methods.

Figure 16:
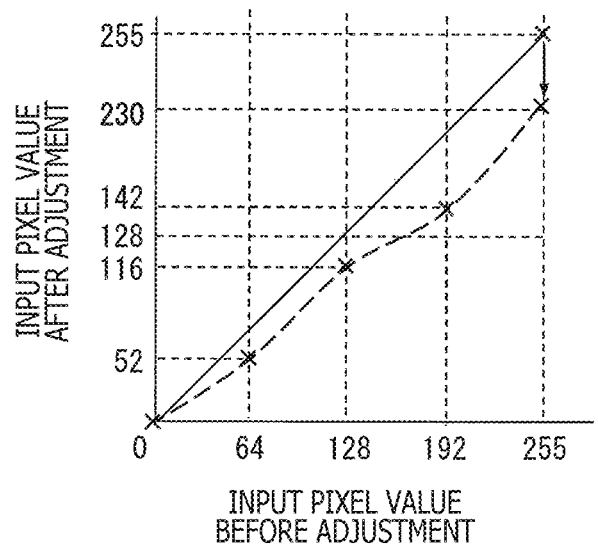
FIG. 16 is a diagram illustrating a corrected value relative to each input pixel value obtained by spline interpolation.

Alternatively, the pixel value limitation process may be performed by using the result of measurement of an image having pixel values other than the maximum pixel value (for example, (R, G, B)=(192, 192, 192), (128, 128, 128), or (64, 64, 64)) instead of using the result of measurement of the image having the maximum pixel value (that is, (R, G, B)=(255, 255, 255)). For example, it is assumed that, in order to make the luminance of the center portion of the display screen closer to the luminance of the edge portion, the value 230 is obtained as the post-adjustment pixel value for the pixel value 255, the value 142 is obtained as the post-adjustment pixel value for the pixel value 192, the value 116 is obtained as the post-adjustment pixel value for the pixel value 128, and the value 52 is obtained as the post-adjustment for the pixel value 64 for each color component by using the method using expression 4 described above. In this case, the post-adjustment pixel values for the respective input pixel values can be calculated by performing spline interpolation, for example, from the post-adjustment pixel values obtained in a discrete manner, as illustrated in FIG. 16.

The pixel value limitation process is performed as described above, and color unevenness correction is performed on the basis of the converted input pixel values. That is, even if the mode is changed, only the input pixel values are changed in the pixel value limitation process, the same conversion table for color unevenness correction is used, and color unevenness correction is performed by referring to the changed input pixel values.

(Modifications of First Embodiment)

A modification of the color unevenness correction table is described. The adjustment value information illustrated in FIG. 5A or FIG. 5B is information for one pixel, and adjustment values are indicated for the RGB values for each of the 27 sets. That is, 81 adjustment values are indicated for one pixel (27×3=81).

In the first embodiment, the color unevenness correction table that includes such adjustment value information for all pixels of the display unit 14 is stored in the storage unit 26. However, in a case where the display unit 14 is a display panel having a large number of pixels constituted by, for example, 1920 pixels×1080 pixels, adjustment value information including 81 adjustment values needs to be stored for 1920 pixels×1080 pixels, resulting in an extremely large volume of data being stored. Accordingly, an index map and a color unevenness correction map as described below are created instead of retaining adjustment value information for all pixels as the color unevenness correction table to thereby reduce the data volume.

When the calibration processing unit 35 obtains, for all pixels, pieces of adjustment value information each indicating adjustment values for one pixel for each of the 27 sets of RGB values as illustrated in FIG. 5A or FIG. 5B, the calibration processing unit 35 separates the pieces of adjustment value information for all pixels into, for example, 256 groups by clustering. Next, the calibration processing unit 35 extracts a representative piece of adjustment value information from each group (extracts one piece of adjustment value information per group). Subsequently, the calibration processing unit 35 stores, in the storage unit 26, a color unevenness correction map (see FIG. 7) in which the 256 pieces of adjustment value information that have been extracted are respectively associated with the identification numbers of the respective pieces of adjustment value information. Further, the calibration processing unit 35 creates an index map (see FIG. 8) that includes, for each pixel, an identification number that corresponds to a piece of adjustment value information that has been extracted from the group to which the piece of adjustment value information regarding the pixel belongs, and also stores the index map in the storage unit 26. The unevenness correction unit 36 refers to the index map stored in the storage unit 26, reads the identification number assigned to an adjustment-target pixel, reads the piece of adjustment value information corresponding to the identification number from the color unevenness correction map, obtains adjustment values from the piece of adjustment value information, and adjusts the pixel values. Accordingly, pieces of adjustment value information for all pixels are not retained as the color unevenness correction table, but pieces of adjustment value information for 256 pixels extracted from the pieces of adjustment value information for all pixels are retained, which results in a reduced data volume. Further, separation into groups is performed by clustering. Therefore, in a case of making an adjustment to a pixel, the adjustment is made by using a piece of adjustment value information that is similar to the piece of adjustment value information regarding the pixel (that has a small error). Therefore, the error is reduced to a level that is not problematic (to a level at which the error is not perceived by a user) in terms of the precision of adjustment.

That is, in the modification in which the index map and the color unevenness correction map are created, color unevenness correction data is not retained for each pixel, but color unevenness correction data is retained for each group constituted by a plurality of pixels.

In the above-described embodiment, in the calibration process, measurement is performed for 27 test images to thereby calculate adjustment values for each of the 27 sets of RGB values, as illustrated in FIG. 5A or FIG. 5B, and the adjustment values are stored as the color unevenness correction table; however, the number of sets need not be 27. The number of sets may be 125 obtained by combining five pixel values 0, 64, 128, 192, and 255, for example, or may be 64 obtained by combining four pixel values 32, 96, 160, and 224, for example.

In the embodiment described above, the display device 10 has only one intermediate mode; however, the display device 10 may, as a matter of course, have a plurality of intermediate modes having different degrees of adjustment. Accordingly, it is possible to respond to a case where a user basically wants to maintain high luminance and to suppress luminance unevenness slightly or, on the contrary, to a case where a user basically wants to suppress luminance unevenness and to increase the luminance slightly.

Alternatively, the adjustment level (the degree of adjustment) of the intermediate mode may be made variable to thereby substantially implement a plurality of intermediate modes having different adjustment levels (that is, if the adjustment level of the intermediate mode can be selected from among a plurality of levels, a plurality of intermediate modes are substantially provided).

Figure 17A:
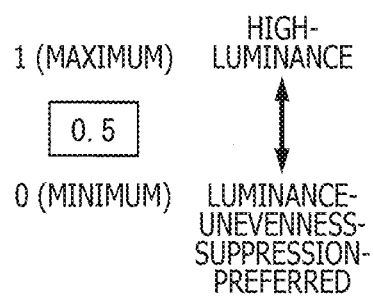
FIG. 17A is a diagram schematically illustrating a UI for mode setting.

For example, the integrated control unit (selection unit) 31 may cause the display unit 14 to display a level setting UI illustrated in FIG. 17A. The level setting UI illustrated in FIG. 17A is a dialog box for inputting a numerical value that indicates an adjustment level. A numerical value between 0 and 1 can be input on the UI. When 0 is input, the integrated control unit 31 sets the luminance-unevenness-suppression-preferred mode. When 1 is input, the integrated control unit 31 sets the high-luminance mode. When a value larger than 0 and smaller than 1 (a decimal) is input, the integrated control unit 31 sets the intermediate mode having an adjustment level that corresponds to the input value.

When the intermediate mode in which the adjustment level is variable is set, the calibration processing unit 35 or the unevenness correction unit 36 performs the pixel value limitation process in the intermediate mode as follows. First, as the assumptions, it is assumed that, in the high-luminance mode, the pixel value limitation process is not performed, and in the luminance-unevenness-suppression-preferred mode, the post-adjustment pixel value for the maximum pixel value is set to 230, and the pixel value limitation process is performed as represented by the function indicated by the reference numeral 400 in FIG. 12. Here, the post-adjustment pixel value for the maximum pixel value in the intermediate mode is smaller than the maximum pixel value (255) in the high-luminance mode and larger than the post-adjustment pixel value (230) for the maximum pixel value in the luminance-unevenness-suppression-preferred mode. Then, if the value illustrated in FIG. 17A that indicates the adjustment level (the value that indicates the degree of brightness) is represented by K (0 to 1), the post-adjustment pixel value for the maximum pixel value in the intermediate mode is expressed as follows.

Post-adjustment pixel value for maximum pixel value in intermediate mode={(Maximum pixel value in high-luminance mode)−(Post-adjustment pixel value for maximum pixel value in luminance-unevenness-suppression-preferred mode)}×K+Post-adjustment pixel value for maximum pixel value in luminance-unevenness-suppression-preferred mode     expression 5

When the maximum pixel value in the high-luminance mode and the post-adjustment pixel value for the maximum pixel value in the luminance unevenness suppression are substituted into expression 5, the result is as follows.

Post-adjustment pixel value for maximum pixel value in intermediate mode=(255−230)×K+230

That is, the intermediate mode can be adjusted to various levels by only changing the value (K) that indicates the adjustment level illustrated in FIG. 17A.

Alternatively, the intermediate mode having the adjustment level K may be implemented as follows. A pixel value P after color unevenness correction, which corresponds to the maximum pixel value (255) in the high-luminance mode, and a pixel value Q after color unevenness correction, which corresponds to the post-adjustment pixel value (230) applied to the maximum pixel value in the luminance-unevenness-suppression-preferred mode, are obtained from the color unevenness correction table. Then, the maximum pixel value (corrected value) after color unevenness correction in the intermediate mode may be directly calculated by using expression 5A below.

Figure 17B:
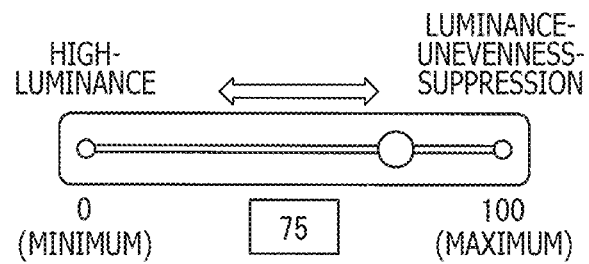
FIG. 17B is a diagram schematically illustrating a UI for mode setting and illustrates an example different from that in FIG. 17A.

Maximum pixel value after color unevenness correction in intermediate mode=Q+(P−Q)×K     expression 5A Note that a value between 0 and 1 including a decimal is input on the UI illustrated in FIG. 17A; however, a percentage value may be used. In this case, a value between 0 (minimum) and 100 (maximum) is input. Alternatively, the adjustment level in the case of the luminance-unevenness-suppression-preferred mode may be set to 100 (maximum value), and the adjustment level in the case of the high-luminance mode may be set to 0 (minimum value), as illustrated in FIG. 17B. Further, the adjustment level may be adjusted by adjusting the position on the slider for facilitating visual recognition to thereby enable setting of the intermediate mode and the adjustment level. At this time, the positions that can be set on the slider may be set in advance to, for example, "0, 25, 50, 75, and 100".

In the first embodiment described above, three modes, namely, the high-luminance mode, the intermediate mode, and the luminance-unevenness-suppression-preferred mode, are provided; however, at least two modes need to be provided. That is, in an aspect of the present invention, a first mode and a second mode for performing color unevenness correction are provided. In the second mode, the pixel value limitation process for uniformly shifting, for each pixel, the pixel values in the image data to lower pixel values needs to be performed to thereby decrease the pixel values to pixel values lower than those in the first mode.

Here, in the first embodiment, the high-luminance mode corresponds to the first mode, and the luminance-unevenness-suppression-preferred mode corresponds to the second mode. In the first embodiment, the color unevenness correction is performed without performing the pixel value limitation process in the high-luminance mode (first mode).

In the first embodiment, selection of the intermediate mode (third mode) is allowed in which the color unevenness correction is performed after the pixel value limitation process in which the degree of the shift is made lower than that in the luminance-unevenness-suppression-preferred mode (second mode) has been performed.

Note that the first and second modes do not necessarily correspond to the pair of the high-luminance mode in which the pixel value limitation process is not performed and the luminance-unevenness-suppression-preferred mode in which the pixel value limitation process is performed. For example, the pair of the intermediate mode and the luminance-unevenness-suppression-preferred mode may correspond to the first and second modes. In this case, the pixel value limitation process is performed in both the intermediate mode (first mode) and the luminance-unevennesssuppression-preferred mode (second mode). In the intermediate mode (first mode), the pixel value limitation process is performed while the degree of the shift of the pixel values is made lower than that in the luminance-unevenness-suppression-preferred mode (second mode). As a result, in the luminance-unevenness-suppression-preferred mode (second mode), the pixel values are decreased to pixel values lower than those in the intermediate mode (first mode).

Selection of an intermediate mode B (third mode) may be allowed in addition to selection of an intermediate mode A (first mode) and the luminance-unevenness-suppression-preferred mode (second mode). In the intermediate mode B (third mode), the pixel value limitation process may be performed while making the degree of the shift lower than that in the luminance-unevenness-suppression-preferred mode (second mode) and higher than that in the intermediate mode A (first mode), and thereafter, the color unevenness correction may be performed.

As a matter of course, the first and second modes described above may correspond to the pair of the high-luminance mode and the intermediate mode. The display device 10 need not have the high-luminance mode and the luminance-unevenness-suppression-preferred mode and may have only the intermediate mode in which the adjustment level is variable. In this case, when the intermediate mode having a first adjustment level is assumed to be the first mode, the intermediate mode having a second adjustment level for which the degree of the shift in the pixel value limitation process is higher than that for the first adjustment level corresponds to the second mode.

(Others)

In a case where the luminance is determined to be relatively uniform, a relative adjustment is made by using adjustment values, such as (R, G, B)=(+1, −1, 0), in color unevenness correction to thereby correct the color unevenness. However, in a case where the luminance is relatively non-uniform, the color unevenness might not be corrected with the above-described method. Accordingly, in such a case, both the luminance unevenness and the color unevenness may be taken into consideration, and an absolute adjustment may be made by using adjustment values, such as (R, G, B)=(+10, +8, +9) (in the case of making an absolute adjustment, a correction table is created separately from that in the case of making a relative adjustment, and color unevenness correction is performed by using one of the correction tables).

Second Embodiment

A second embodiment relates to a position determining device 600 that determines optimum positioning of a plurality of the display devices 10 according to the first embodiment in a multi-display formed by arranging the display devices 10. Note that this embodiment assumes that the display devices 10 have three modes, namely, the high-luminance mode, the luminance-unevenness-suppression-preferred mode, and the intermediate mode, described with reference to FIG. 12, and that the adjustment level in each mode is fixed. That is, the modification of the first embodiment allows the adjustment level in the intermediate mode to be variable. However, in the display devices 10 according to this embodiment, the adjustment level is not variable in the intermediate mode, the function in FIG. 12 is obtained by performing linear interpolation, for example, using the post-adjustment pixel value for the maximum pixel value stored in advance in the storage unit 26, and the pixel value limitation process is performed on the basis of the function.

Figure 18:
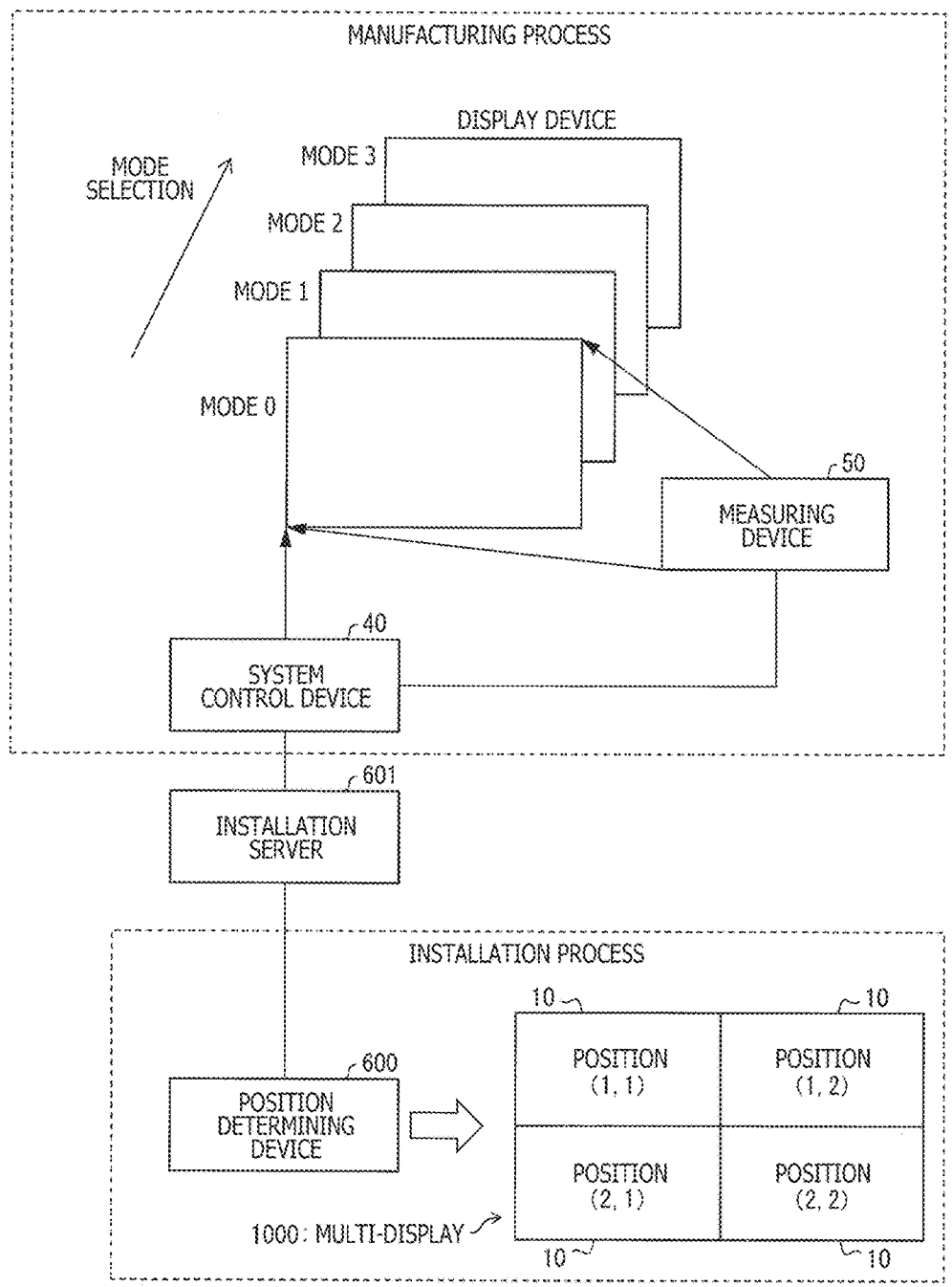
FIG. 18 is a diagram schematically illustrating an overall configuration of a position determining system according to a second embodiment.

FIG. 18 is a diagram illustrating an overall configuration of a position determining system using the position determining device 600 and an installation server 601 according to this embodiment. As illustrated in FIG. 18, the position determining system includes the measuring device 50 and the system control device 40 used in a manufacturing process, the position determining device 600 used in an installation process, and the installation server 601 that performs data transmission and reception with the system control device 40 and with the position determining device 600. The system control device 40, the position determining device 600, and the installation server 601 are general-purpose personal computers.

(Manufacturing Process)

Figure 19:
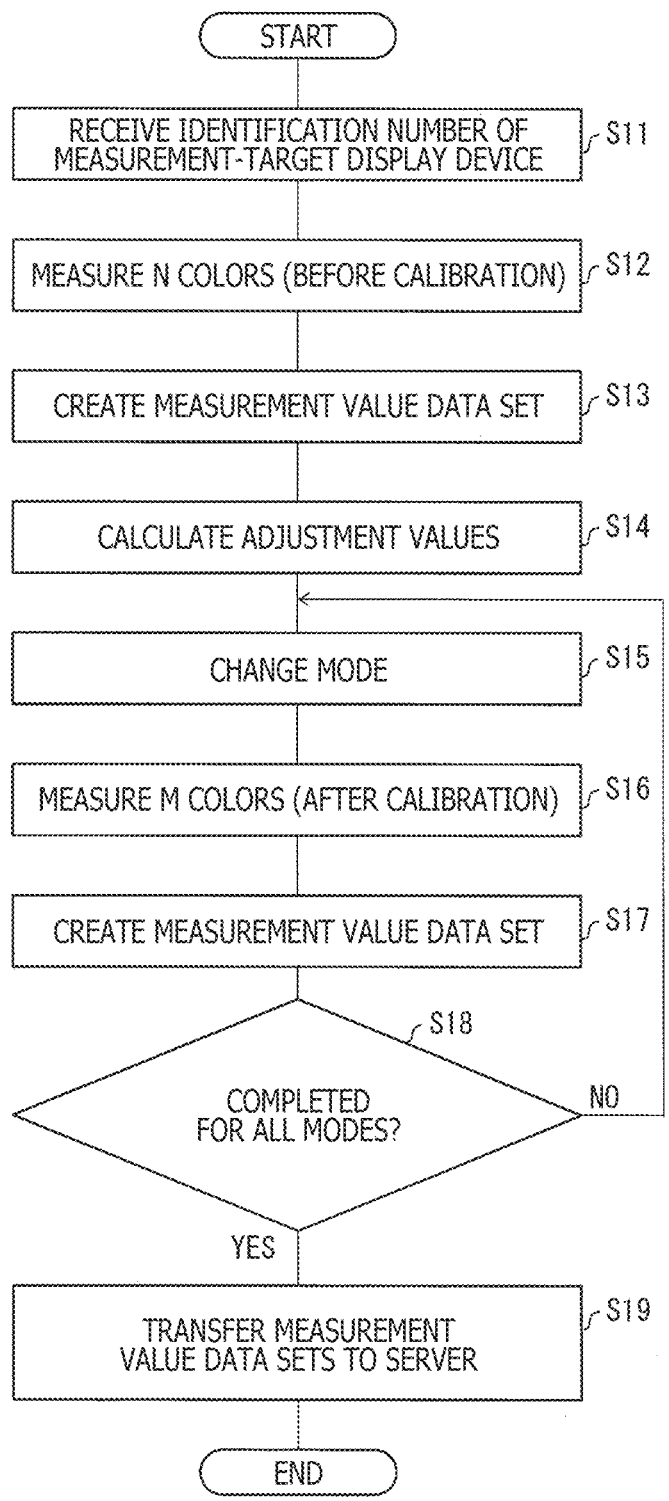
FIG. 19 is a flowchart illustrating a flow of processing performed in a manufacturing process illustrated in FIG. 18.

In the manufacturing process in FIG. 18, the display devices 10 as illustrated in FIG. 1 described in the first embodiment, the measuring device 50, and the system control device 40 are used. That is, in the manufacturing process in FIG. 18, measurement is performed on test images displayed on the display devices 10, and the calibration processing unit 35 performs the calibration process on the basis of the results of measurement, and creates and stores, in the storage unit 26, the color unevenness correction table. At this time, the calibration processing unit 35 calculates and stores, in the storage unit 26, parameters (corrected values for the maximum pixel value) respectively used in the luminance-unevenness-suppression-preferred mode and in the intermediate mode. Further, in this embodiment, processing is performed in which measurement is performed on test images displayed in each of the luminance-unevenness-suppression-preferred mode, the intermediate mode, and the high-luminance mode, and the results of measurement obtained in each mode are stored on the installation server 601 as position determining data (measurement data sets). The flow of processing in the manufacturing process is illustrated in FIG. 19 as a flowchart. The processing in the manufacturing process is described in detail below with reference to FIG. 19.

First, it is assumed that the display device 10 that is a process target is initially set to a through mode (mode 0) in which no processing is performed by the unevenness correction unit 36. The system control device 40 receives the identification number of the process-target display device 10 in accordance with a user operation (S11).

Subsequently, in S12 to S14, processing similar to the measurement and calibration process described in the first embodiment is performed. That is, in S12, the system control device 40 causes the display device 10 to display test images and causes the measuring device 50 to measure the colors of the displayed images (S12). In this measurement, N (N=27, for example) test images having different colors are sequentially displayed, images of the test images are captured, and the results of measurement are obtained.

Subsequently, the system control device 40 puts together N measurement results (sets of XYZ values) obtained by displaying the N test images (N colors) as a measurement data set 0 (S13). Note that, in this embodiment, it is assumed that the N test images (N colors) include a test image of (R, G, B)=(255, 255, 255), and that the measurement results include luminance values in addition to the sets of XYZ values. The measurement data set 0 is associated with the identification number input in S11 and temporarily stored on the system control device 40.

Subsequently, the system control device 40 transmits a calibration process instruction to the display device 10 together with the measurement data set 0. Accordingly, the calibration processing unit 35 of the display device 10 performs the calibration process by using the measurement data set 0 and the reference data illustrated in FIG. 2 and calculates adjustment values for color unevenness correction for each pixel (S14). The details of the calibration process are as described in the first embodiment.

The calibration processing unit 35 stores sets of adjustment values for 27 colors calculated from the measurement data set 0 in the storage unit 26 as the color unevenness correction table.

In S14, the calibration processing unit 35 performs a process for calculating parameters (corrected values for the maximum pixel value) respectively used in the luminance-unevenness-suppression-preferred mode and in the intermediate mode in addition to the calibration process and stores the parameters in the storage unit 26. The process for calculating the parameters are as described in the first embodiment. That is, the parameters can be calculated by using measured values (luminance values) of the test image of (R, G, B)=(255, 255, 255) and expression 4 in the first embodiment. As a matter of course, the relationship between the pixel value before an adjustment and that after the adjustment illustrated in FIG. 12 may be retained in the storage unit 26 as a one-dimensional look-up table.

After S14, the system control device 40 changes the mode set for the display device 10 (S15). Specifically, the system control device 40 changes the mode of the display device 10 from the through mode (mode 0) to the high-luminance mode (mode 1).

In the display device 10 in which the mode is changed to the high-luminance mode, the unevenness correction unit 36 starts operating. When image data (including data of a test image) is input, the unevenness correction unit 36 performs color unevenness correction on the image data in the high-luminance mode (that is, the display device 10 is in a calibrated state).

When the mode is changed in S15, the system control device 40 causes the display device 10 to display a test image and causes the measuring device 50 to measure the color of the test image (S16). That is, measurement is performed on a display device that has not been calibrated (a display device that displays an image for which unevenness has been corrected) in S12 while measurement is performed on a display device that has been calibrated (a display device that displays an image for which unevenness has been corrected) in S16. That is, in the case where the mode is set to the high-luminance mode, a test image for which color unevenness correction has been performed by the unevenness correction unit 36 in the high-luminance mode is displayed on the display unit 14.

Note that, in S16, M (M<N, M=10, for example) test images having different colors are sequentially displayed, images of the test images are captured, and the results of measurement are obtained.

After S16, the system control device 40 puts together the measurement results in the high-luminance mode (mode 1) as a measurement data set 1 (S17). That is, in S17, M measurement results (sets of XYZ values) obtained by displaying the M test images (M colors) are put together as the measurement data set 1. The measurement data set 1 is associated with the identification number input in S11 and is temporarily stored on the system control device 40.

After S17, the system control device 40 determines whether creation of a measurement data set is completed for all modes (the high-luminance mode, the intermediate mode, and the luminance-unevenness-suppression-preferred mode) (S18).

If creation is not completed (No in S18), the flow returns to S15, and the system control device 40 changes the mode of the display device 10 to a mode for which a measurement data set has not been created and repeats the process in S16 and thereafter. Note that the mode is changed from the high-luminance mode to the intermediate mode (mode 2) and from the intermediate mode to the luminance-unevenness-suppression-preferred mode (mode 3).

In the intermediate mode or in the luminance-unevenness-suppression-preferred mode, a test image for which color unevenness correction has been performed by the unevenness correction unit 36 in the mode is displayed on the display unit 14 in S16. That is, color unevenness correction is performed after the pixel value limitation process has been performed. A measurement data set created in S17 in the intermediate mode is a measurement data set 2, and a measurement data set created in S17 in the luminance-unevenness-suppression-preferred mode is a measurement data set 3.

After creation of a measurement data set is completed for all modes (Yes in S18), the system control device 40 associates the identification number with the measurement data sets 0 to 3 and transmits the measurement data sets 0 to 3 and the identification number to the installation server 601 (S19), and processing ends.

FIG. 20 is a table illustrating relationships between the modes and the measurement data sets. The measurement data set 0 is data that indicates measurement results obtained by measuring the colors of test images displayed in a non-correction mode (mode 0) in which the unevenness correction unit 36 is not operated. The measurement data set 1 is data that indicates measurement results obtained by measuring the colors of test images displayed in the high-luminance mode (mode 1) in which color unevenness correction is performed without performing the pixel value limitation process. The measurement data set 3 is data that indicates measurement results obtained by measuring the colors of test images displayed in the luminance-unevenness-suppression-preferred mode (mode 3) in which color unevenness correction is performed after the pixel value limitation process has been performed. The measurement data set 2 is data that indicates measurement results obtained by measuring the colors of test images displayed in the intermediate mode (mode 2) in which color unevenness correction is performed after the pixel value limitation process has been performed and in which the adjustment width in the pixel value limitation process is made narrower than that in the luminance-unevenness-suppression-preferred mode.

Now, information stored on the installation server 601 is described. FIG. 21 is a diagram illustrating a database which is stored in a storage unit of the installation server 601 and in which measurement data sets are accumulated. In the database illustrated in FIG. 21, the identification number of each display device 10, the corresponding measurement data set 0 in the through mode, the corresponding measurement data set 1 in the high-luminance mode, the corresponding measurement data set 2 in the intermediate mode, and the corresponding measurement data set 3 in the luminance-unevenness-suppression-preferred mode are associated with one another and stored.

That is, in the manufacturing process, the processing in FIG. 19 is performed for each of the display devices 10 that are manufactured in large quantities, and information in which the identification number and the measurement data sets 0 to 4 are associated with one another is accumulated on the installation server 601 for each display device.

(Installation Process)

In a case of forming a multi-display by arranging the display devices 10 having a plurality of modes of different degrees of unevenness correction, a positioning pattern may be optimum in a certain mode but another positioning pattern might not be optimum in the mode. This is because the state of unevenness suppression in each mode slightly differs among the display devices 10. Therefore, in a case of installing a multi-display constituted by a plurality of the display devices 10, optimum positioning needs to be determined for a mode that is set at the time of installation.

Accordingly, in this embodiment, in the installation process illustrated in FIG. 18, the position determining device 600 (a note PC, for example) determines optimum positioning corresponding to a mode that is set when a multi-display 1000 formed by arranging the display devices 10 is installed. That is, software for determining optimum positioning is installed on the position determining device 600. Note that, in this embodiment, an example is described in which the display devices 10 are arranged in two rows and in two columns, that is, four display devices 10 are arranged in a 2×2 matrix, to thereby constitute the multi-display 1000, as illustrated in FIG. 18. However, the number of rows and the number of columns in which the display devices 10 that constitute the multi-display 1000 are arranged are not limited to the above-described numbers.

FIG. 22 is a flowchart illustrating a flow of processing in the installation process. First, the position determining device 600 receives the identification numbers of the display devices 10 that are installation targets in accordance with an operator operation (S21). Subsequently, the position determining device 600 accesses the installation server 601 and receives, from the installation server 601, the measurement data sets 0 to 4 that are associated with each of the identification numbers input in S21 (S22). For example, if four display devices 10 constitute the multi-display 1000, the identification numbers of the four display devices 10 are input in S21, and the measurement data sets for each of the four display devices 10 are downloaded to the position determining device 600 in S22.

Subsequently, the position determining device 600 receives, in accordance with a user operation, the mode number of a mode that is planned to be set for the display devices 10 when the multi-display 1000 is installed (S23). Specifically, a number that indicates one of the through mode, the high-luminance mode, the intermediate mode, and the luminance-unevenness-suppression-preferred mode described above is input. Note that, in this embodiment, the through mode can be set for the display devices 10. In this case, the display devices 10 display an image on the display unit 14 without performing processing by the unevenness correction unit 36. That is, in the case where the through mode is set for the display devices 10 at the time of installation, which is an extremely rare case, the number of the through mode is input in S23.

After S23, the position determining device 600 uses the measurement data set that corresponds to the mode corresponding to the mode number input in S23 among the measurement data sets received in S22 to perform an optimum position determining process for determining optimum positioning of the display devices 10 (S24). The details of the optimum position determining process in S24 are described below.

After S24, the position determining device 600 displays a recommended positioning example that indicates the identification numbers and positions (sets of coordinate values) of the display devices 10 on the monitor of the position determining device 600 (S25). For example, as indicated by the reference numeral 850 in FIG. 25, the identification numbers (XX0001, XX0003, XX0016, XX0020) of the display devices 10, the sets of coordinate values ((1, 1), (1, 2), (2, 1), (2, 2)) that indicate the positions of the display devices 10, and the layout of the display devices are displayed on the monitor. Alternatively, as indicated by the reference numeral 851 in FIG. 25, the relationships between the identification numbers of the display devices 10 and the sets of coordinate values indicating the positions of the display devices 10 may be simply displayed.

Figure 25:
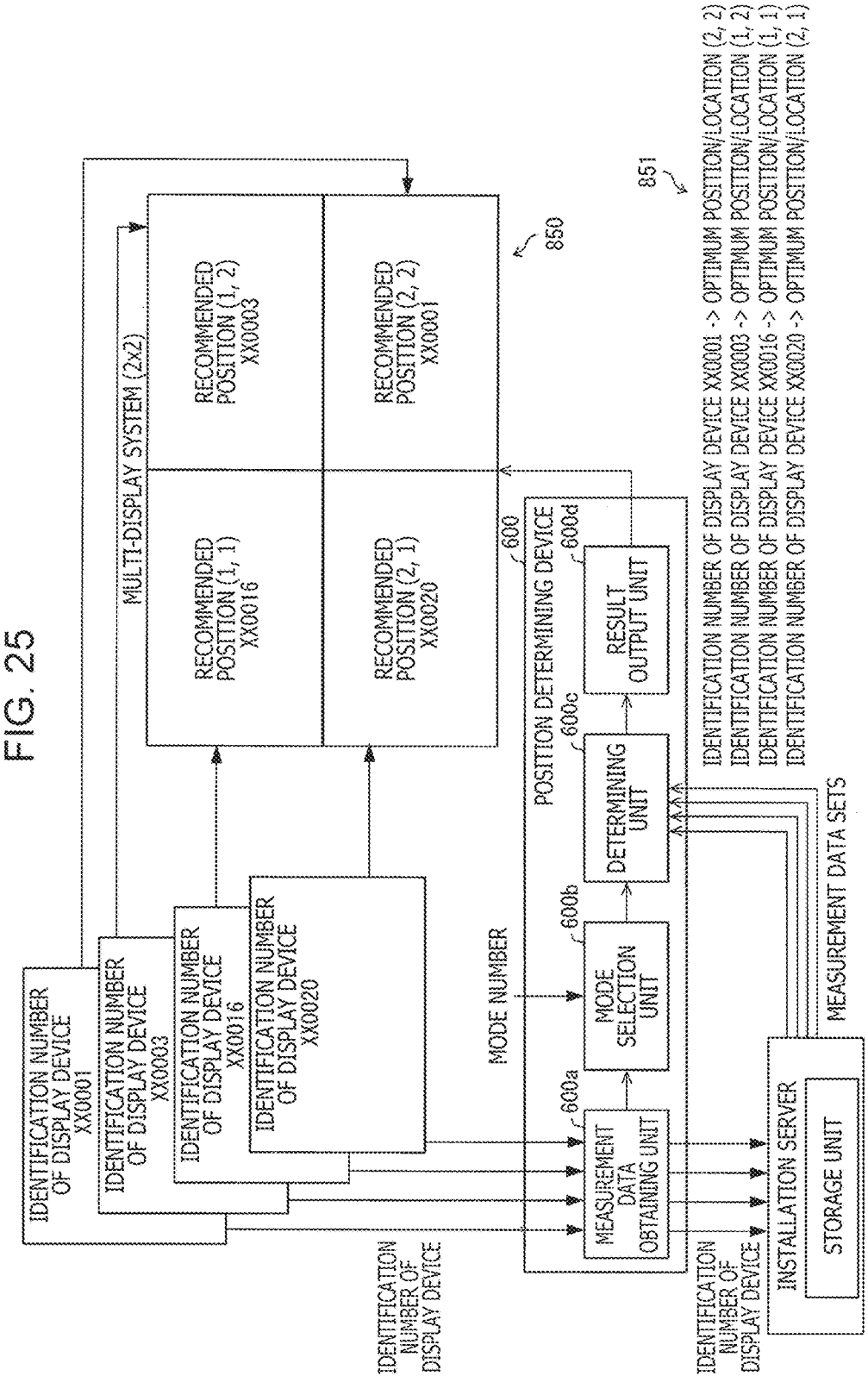
FIG. 25 is an explanatory diagram illustrating an overview of the installation process.

Now, a configuration of the position determining device 600 is described with reference to FIG. 25. The position determining device 600 is a general-purpose computer constituted by a processor and a storage device. The position determining device 600 includes a measurement data obtaining unit 600a, a mode selection unit 600b, a determining unit 600c, and a result output unit 600d, as illustrated in FIG. 25. Note that the units 600a to 600d included in the position determining device 600 are functional blocks representing functions implemented by software.

The measurement data obtaining unit 600a is a block that, when a user inputs the identification numbers of the display devices 10, downloads the measurement data sets associated with each of the identification numbers from the installation server 601. The mode selection unit 600b selects the mode corresponding to a mode number input by the user. The determining unit 600c performs the optimum position determining process by using the measurement data set that corresponds to the mode selected by the mode selection unit 600b. The result output unit 600d displays the result of determination in the optimum position determining process on the monitor of the position determining device 600.

(Optimum Position Determining Process)

Now, the optimum position determining process in S24 in FIG. 22 is described in detail. The optimum position determining process can be implemented by using a known method, and a method described in PTL 2 (Japanese Unexamined Patent Application Publication No. 2014-26120) is used in this embodiment. The process is specifically performed as follows.

First, the determining unit 600c sets nine reference areas in each of the display devices 10, as illustrated in FIG. 23. Specifically, the entire display screen is divided into nine portions to set nine divided sections that are arranged in a 3×3 matrix (each divided section has a shape (rectangular shape) and an aspect ratio identical to those of the display screen and has an area that is one-ninth the area of the display screen). An area constituted by 200×200 pixels in each divided section is assumed to be the reference area. Note that the size of the reference area is not limited to 200×200 pixels and can be changed as appropriate.

Next, the determining unit 600c detects the measurement data set that corresponds to the mode corresponding to the mode number input in S23 in FIG. 22 among the downloaded measurement data sets 0 to 3. If the mode number 3 (luminance-unevenness-suppression-preferred mode), for example, is input in S23, the measurement data set 3 is detected.

Subsequently, the determining unit 600c selects one color from among the M colors (or N colors) indicated in the detected measurement data set. The selected color may be set in advance or may be determined in accordance with an instruction input by the operator of the position determining device 600. Here, it is assumed that the color (R, G, B)=(255, 255, 255) is selected.

The determining unit 600c calculates, for the selected color (R, G, B)=(255, 255, 255), a set of representative values of sets of measured values (for example, a set of the averages of sets of measured values for all pixels) for each reference area of each of the display devices 10. Note that, although each set of measured values are XYZ values, the calculated set of representative values are converted to L*a*b* values (L*a*b* data of CIE 1976).

Next, the determining unit 600c calculates a color difference ΔE between reference areas that face each other across the boundary between the two display devices adjacent to each other for one positioning pattern among all positioning patterns that can be set. The color difference ΔE is calculated from the sets of representative values calculated from the measured values that correspond to the selected color (R, G, B)=(255, 255, 255).

Figure 26:
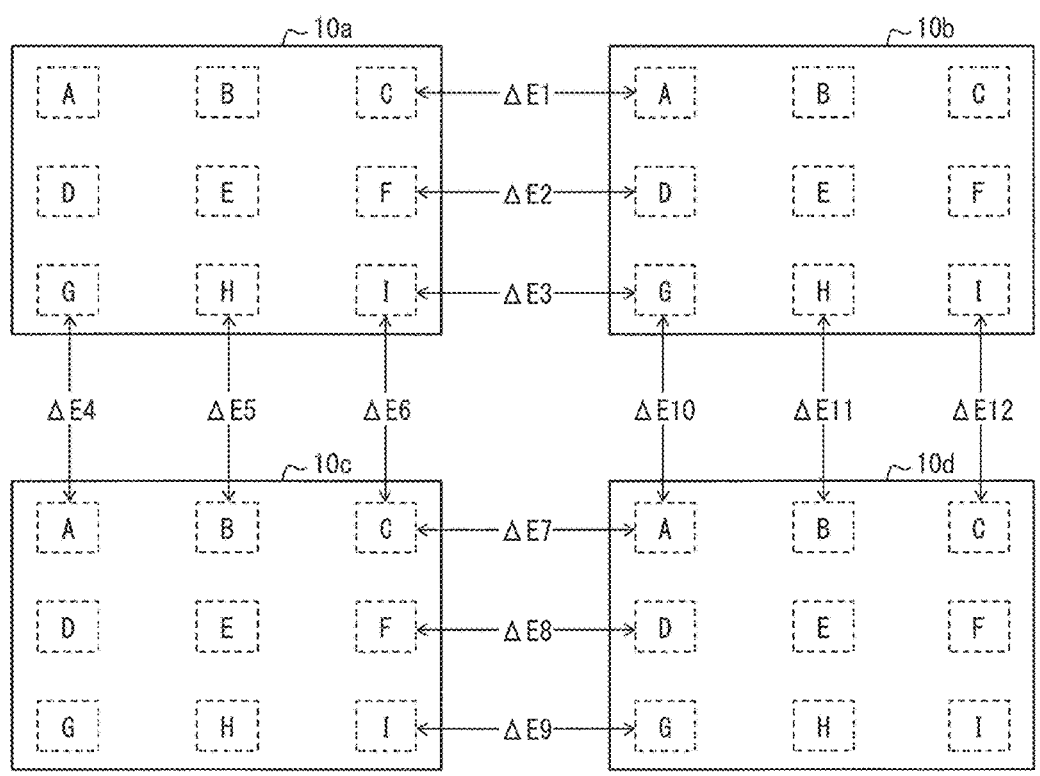
FIG. 26 is a diagram for describing a color difference ΔE calculated in an optimum position determining process.

Specifically, when the positioning pattern illustrated in FIG. 26 is considered, for example, 12 color differences ΔE1 to ΔE12 are calculated. Here, ΔE1 is a color difference between the reference area C of the display device 10a and the reference area A of the display device 10b, ΔE2 is a color difference between the reference area F of the display device 10a and the reference area D of the display device 10b, and ΔE3 is a color difference between the reference area I of the display device 10a and the reference area G of the display device 10b. Similar to ΔE1 to ΔE3, ΔE7 to ΔE9 are color differences between reference areas of the display device 10c and reference areas of the display device 10d. Further, ΔE4 is a color difference between the reference area G of the display device 10a and the reference area A of the display device 10c, ΔE5 is a color difference between the reference area H of the display device 10a and the reference area B of the display device 10c, and ΔE6 is a color difference between the reference area I of the display device 10a and the reference area C of the display device 10c. Similar to ΔE4 to ΔE6, ΔE10 to ΔE12 are color differences between reference areas of the display device 10b and reference areas of the display device 10d.

The determining unit 600c identifies the largest one among ΔE1 to ΔE12 thus calculated as a maximum color difference ΔE for the one positioning pattern. Such a maximum color difference ΔE is calculated for each of the all positioning patterns that can be set. Then, the determining unit 600c determines a positioning pattern for which the value of the maximum color difference ΔE is smallest as optimum positioning.

As described above, according to this embodiment, optimum positioning is determined on the basis of measured values obtained by measuring a test image displayed in a mode that is set at the time of installation. Therefore, for a multi-display using display devices having a plurality of modes of different degrees of unevenness correction, optimum positioning for the mode set at the time of installation can be determined, which is an advantage.

In the above-described embodiment, the position determining device 600 is used in the installation process to determine optimum positioning. However, even in a case where the mode needs to be changed after installation, optimum positioning can be determined as a matter of course. Specifically, it is assumed that a multi-display constituted by a plurality of the display devices 10 is installed, the mode is set, and the multi-display starts being used. In a case where the mode needs to be changed thereafter, the position determining device 600 may be caused to download the measurement data sets from the installation server 601 and to perform the optimum position determining process. That is, with the position determining device 600 according to this embodiment, each time the mode is changed, optimum positioning for the changed mode can be identified.

Further, in the above-described embodiment, a test image displayed after each mode has been set is measured, and optimum positioning is determined on the basis of measured values obtained in the measurement. That is, optimum positioning is determined by using measured values of a test image for which correction by the unevenness correction unit 36 has been performed. Therefore, unlike a system in which positioning is determined on the basis of the result of measurement obtained without performing unevenness correction, calculation can be made less complicated, and the precision of determination can be increased.

Further, according to the above-described embodiment, as long as the measurement data sets are stored on the installation server 601 in the installation process, the measurement data sets can be used later as many times as needed. Therefore, even in a case where the multi-display 1000 is installed, and thereafter, determination by the position determining device 600 needs to be performed again because the set mode is changed, only the measurement data sets need to be downloaded again from the installation server 601. Accordingly, it is possible to save time to newly perform measurement at the site of installation.

Further, even if one of the display devices 10 becomes faulty after installation of the multi-display and needs to be replaced, optimum positioning can be determined each time replacement is necessary.

Figure 24:
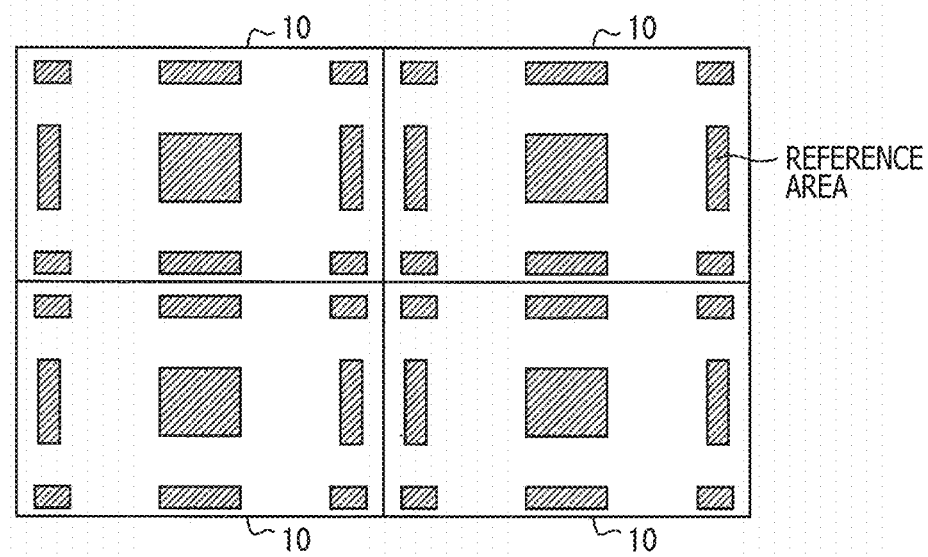
FIG. 24 is a diagram schematically illustrating reference areas set in each display device that constitutes the multi-display according to the second embodiment, and illustrates an example different from that in FIG. 23.

Further, in the above-described embodiment, reference areas are set in the form as illustrated in FIG. 23; however, the form is not limited to that illustrated in FIG. 23. For example, a form may be employed in which, in the vicinity of the bezels, rectangular reference areas each having long sides that are parallel to the corresponding one of the bezels are arranged, as illustrated in FIG. 24.

Further, in the above-described embodiment, test images of M colors are displayed and measured in S16 in FIG. 19; however, M may be one. For example, measurement may be performed only on white ((R, G, B)=(255, 255, 255)) or a test may be performed only on high-luminance gray ((R, G, B)=(240, 240, 240)). Note that, in such cases, the process in S24 in FIG. 22 in which one color is selected from among M colors is omitted as a matter of course, and a measurement data set for one color measured in S16 in FIG. 19 is used.

The value of M may vary depending on the mode. For example, measurement may be performed for five colors in the high-luminance mode (mode 1), two colors in the intermediate mode (mode 2), and three colors in the luminance-unevenness-suppression-preferred mode.

Figure 27:
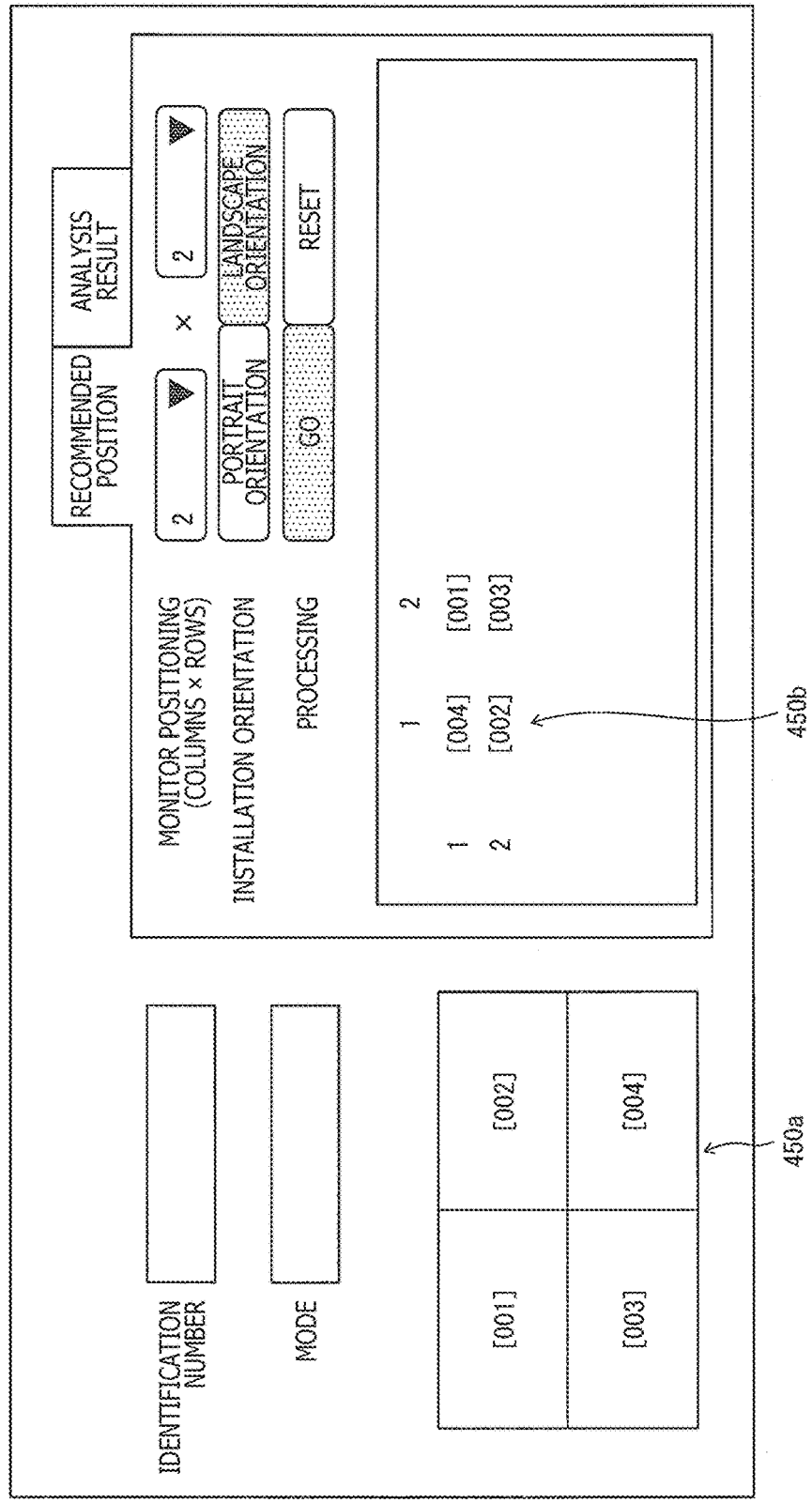
FIG. 27 is a diagram illustrating a UI displayed on a monitor of a position determining device.

The position determining device 600 may display a UI as illustrated in FIG. 27 on the monitor to allow information to be input and determination results to be output on the UI. The operator inputs the identification numbers of the display devices 10 and the mode number on the UI illustrated in FIG. 27. The operator inputs the number of monitors to be positioned by using a pull-down menu and selects the installation orientation by using a button. When the operator finishes inputting all information, the operator presses a GO button. When the GO button is pressed, the determining unit 600c performs determination, and the result output unit 600d reflects the result of determination on the UI. On the UI in FIG. 27, a layout (indicated by the reference numeral 450a) in which the positions of the display devices assigned the identification numbers ([001] to [004]) are displayed and relationships (indicated by the reference numeral 450b) between the identification numbers of the display devices and the position numbers are displayed.

Note that, also in the second embodiment, three modes, namely, the high-luminance mode, the intermediate mode, and the luminance-unevenness-suppression-preferred mode, are provided as in the first embodiment; however, at least two modes (that is, a plurality of modes) need to be provided. That is, similar to the display device 10 according to the first embodiment, the display device 10 according to the second embodiment needs to have the first and second modes for performing color unevenness correction. In the second mode, the pixel value limitation process for uniformly shifting, for each pixel, the pixel values in the image data to lower pixel values needs to be performed to thereby decrease the pixel values to pixel values lower than those in the first mode.

Note that, in the second embodiment, the high-luminance mode corresponds to the first mode, and the luminance-unevenness-suppression-preferred mode corresponds to the second mode as in the first embodiment, and selection of the intermediate mode (third mode) is allowed in which the color unevenness correction is performed after the pixel value limitation process in which the degree of the shift is made lower than that in the luminance-unevenness-suppression-preferred mode (second mode) has been performed, as in the first embodiment.

Note that, also in the second embodiment, the first and second modes do not necessarily correspond to the pair of the high-luminance mode in which the pixel value limitation process is not performed and the luminance-unevenness-suppression-preferred mode in which the pixel value limitation process is performed, as in the first embodiment. For example, the pair of the intermediate mode and the luminance-unevenness-suppression-preferred mode may correspond to the first and second modes respectively. In this case, the pixel value limitation process is performed in both the intermediate mode (first mode) and the luminance-unevenness-suppression-preferred mode (second mode). In the intermediate mode (first mode), the pixel value limitation process is performed while the degree of the shift of the pixel values is made lower than that in the luminance-unevenness-suppression-preferred mode (second mode). As a result, in the luminance-unevenness-suppression-preferred mode (second mode), the pixel values are decreased to pixel values lower than those in the intermediate mode (first mode).

Also in the second embodiment, selection of the intermediate mode B (third mode) may be allowed in addition to selection of the intermediate mode A (first mode) and the luminance-unevenness-suppression-preferred mode (second mode), as in the first embodiment. In the intermediate mode B (third mode), the pixel value limitation process may be performed while making the degree of the shift lower than that in the luminance-unevenness-suppression-preferred mode (second mode) and higher than that in the intermediate mode A (first mode), and thereafter, the color unevenness correction may be performed.

As a matter of course, the first and second modes described above may correspond to the pair of the high-luminance mode and the intermediate mode.

Third Embodiment

A third embodiment is a form, which corresponds to a modification of the second embodiment. In the second embodiment, the measurement data sets 0 to 4 for each of the display devices 10 are stored in the storage unit of the installation server 601; however, the measurement data sets 0 to 4 of each of the display devices 10 may be stored in the storage unit 26 of the display device 10 instead of the storage unit of the installation server 601. The third embodiment is a form in which the measurement data sets 0 to 4 of each display device 10 are stored in the storage unit 26 of the display device 10. This embodiment is described below.

In this embodiment, the measurement data sets 0 to 3 are transmitted from the system control device 40 to the display device 10 in S19 in FIG. 19, not to the installation server 601, and stored in the storage unit 26 of the display device 10. Note that the measurement data set 0 is transmitted to the display device 10 between S13 and S14, and therefore, transmission thereof can be omitted in S19.

The installation process is performed as follows. First, the display devices 10 used for the multi-display 1000 are connected to the position determining device 600 via a LAN cable, for example, so as to enable communication. Accordingly, the position determining device 600 can read, from each display device 10, a combination of the identification number of the display device 10 and the measurement data sets 0 to 4 of the display device 10.

Alternatively, a form may be employed in which, from each display device 10 to the position determining device 600, a combination of the identification number of the display device 10 and the measurement data sets 0 to 4 of the display device 10 are conveyed by using an external storage device, such as a USB memory. In this case, each display device 10 includes a processing unit (software) that, upon detection of a USB memory being inserted, writes the measurement data sets 0 to 4 stored in the storage unit 26 and the identification number to the USB memory.

When the combination of the identification number and the measurement data sets 0 to 4 of each display device 10 is thus taken in the position determining device 600, the position determining device 600 performs the process from S23 to S25 in FIG. 22 to determine optimum positioning and outputs the result of determination. Accordingly, when a multi-display is formed, the measurement data sets stored in the storage unit 26 of each of the display devices 10 that are used may be used to perform the optimum position determining process.

According to this embodiment, an advantage as described below is offered in addition to the advantages offered by the second embodiment. In a case of performing determination using the position determining device 600 at the site of installation, an environment for accessing an external network is not necessary, and therefore, determination can be performed even in a case where a communication environment is not provided.

Fourth Embodiment

Even if optimum positioning is determined as in the second and third embodiments, such optimum positioning is only positioning with which unevenness (variations in luminance or color) between the display devices is likely to be suppressed to the greatest possible extent. Even if the display devices are positioned in accordance with the optimum positioning, unevenness is not completely eliminated.

Therefore, in this embodiment, the position determining device 600 includes an offset value calculation unit (not illustrated). The offset value calculation unit calculates and sets, for each display device, offset values for making variations occurring in the vicinity of the bezel of each of the display devices 10 that are positioned in accordance with optimum positioning less noticeable between S24 and S25 in FIG. 22.

The offset values are values applied to reference pixel values (a set of RGB values that serves as the reference). The reference pixel values are set in advance by the manufacturer and are assumed to be (255, 255, 255) in this embodiment. The offset value calculation unit calculates, for each display device 10, offset values (for example, (−3, −4, −5)) that are applied to the reference pixel values after S24 in FIG. 22.

The method for calculating the offset values is described below. First, the offset value calculation unit sets eight points P1 to P8 on the multi-display 1000 in which the display devices 10 are optimally positioned, as illustrated in FIG. 29.

Note that, as the points P1 to P8, the reference areas used in S24 are used. Specifically, it is supposed that the display devices 10*a* to 10*d* illustrated in FIG. 26 and FIG. 29 are optimally positioned. Then, the reference area F of the display device 10*a* is assumed to be the point P1. The reference area H of the display device 10*a* is assumed to be the point P3. The reference area D of the display device 10*b* is assumed to be the point P2. The reference area H of the display device 10*b* is assumed to be the point P4. The reference area B of the display device 10*c* is assumed to be the point P5. The reference area F of the display device 10*c* is assumed to be the point P7. The reference area B of the display device 10*d* is assumed to be the point P6. The reference area D of the display device 10*d* is assumed to be the point P8. That is, the offset value calculation unit sets, for each of the four boundaries between the display devices adjacent to each other, a pair of points that face each other across the boundary.

Next, the offset value calculation unit uses the measurement data set corresponding to a mode that corresponds to the mode number input in S23 to calculate a set of representative values of sets of measured values for each of the points P1 to P8 as L*a*b* values. Note that, if the color selected by the determining unit 600*c* from among the M colors in S24 is identical to the color represented by the reference pixel values, a set of representative values of each reference area, which corresponds to the point, has been calculated in S24, and therefore, the set of representative values may be used as is.

The offset value calculation unit calculates a desired L* value, a desired a* value, and a desired b* value. The desired L* value is the average of the L* values of the points P1 to P8. The desired a* value is the average of the a* values of the points P1 to P8. The desired b* value is the average of the b* values of the points P1 to P8. That is, for the multi-display 1000 constituted by four display devices 10, one desired L* value, one desired a* value, and one desired b* value are calculated from the L* value, the a* value, and the b* value of each of the eight target points.

Subsequently, the offset value calculation unit calculates ΔL, Δa, and Δb for each of the points P1 to P8, where ΔL indicates the difference between the desired L* value and the L* value of the point of interest, Δa indicates the difference between the desired a* value and the a* value of the point of interest, and Δb indicates the difference between the desired b* value and the b* value of the point of interest. The offset value calculation unit calculates ΔE for each of the points P1 to P8, where ΔE can be calculated by using expression 6 below, for example.

$$\Delta E = \{(\Delta L)^2 + (\Delta a)^2 + (\Delta b)^2\}^{1/2} \quad \text{expression 6}$$

Next, the offset value calculation unit sets one target point for each of the display devices 10*a* to 10*d*. Specifically, although a pair of points is set for each of the display devices 10*a* to 10*d*, as illustrated in FIG. 29, a point having a larger ΔE (a point for which ΔE is largest) among the pair of points is set as a target point for each of the display devices 10*a* to 10*d*.

For example, as illustrated in FIG. 29, the pair of the point P1 and the point P3 is set for the display device 10*a*. In a case where ΔE of the point P1 is larger than ΔE of the point P3, the offset value calculation unit sets the point P1 as the target point of the display device 10*a*. The offset value calculation unit sets the target point for each of the display devices 10*b* to 10*d* in a similar manner as for the display device 10*a*.

In the above example, two points are set for each display device; however, three or more points may be set for each display device. In this case, three or more points are set per display device such that the points face each other across the boundary between the display devices adjacent to each other. Then, ΔE is calculated for each point as in the above example (L*a*b* values (a set of representative values) are calculated for each point, the average of the L* values of all points, the average of the a* values of the all points, and the average of the b* vales of all points are assumed to be desired values, and ΔE is calculated by using the desired values for each point). In each display device, a point for which ΔE is largest among the three or more points is extracted as the target point.

Subsequently, the offset value calculation unit initially sets offset values (ΔR, ΔG, ΔB) for each of the display devices 10*a* to 10*d*. Specifically, the offset value calculation unit initially sets, for each of the display devices 10*a* to 10*d*, the offset values by using Δa and Δb of the target point of the display device as follows.

If Δa>0 is satisfied, a negative value, which is ΔR=Offset coefficient A×(−1), is initially set so as to make R lower (to suppress red).

If Δa<0 is satisfied, a negative value, which is ΔG=Offset coefficient B×(−1), is initially set so as to make G lower (to suppress green).

If Δb>0 is satisfied, a negative value, which is ΔR=Offset coefficient C×(−1), and a negative value, which is ΔG=Offset coefficient C×(−1), are initially set so as to make R and G lower (to suppress yellow).

If Δb<0 is satisfied, a negative value, which is ΔB=Offset coefficient D×(−1), is initially set so as to make B lower (to suppress blue).

Note that the offset coefficients A, B, C, and D are positive numbers and are set as follows: A=1, B=1, C=2, D=1, for example. However, these are values that depend on the properties of the display device and may be set to any values. Specifically, if Δa>0 and b>0 are satisfied, ΔR, ΔG, and ΔB are set as follows: ΔR=Offset coefficient A×(−1)+Offset coefficient C×(−1)=(−1)×(Offset coefficient A+Offset Coefficient C), ΔG=Offset coefficient C×(−1), ΔB=0. If Δa<0 and Δb>0 are satisfied, ΔR, ΔG, and ΔB are set as follows: ΔR=Offset coefficient C×(−1), ΔG=(Offset coefficient B+Offset Coefficient C)×(−1), ΔB=0. If Δa>0 and Δb<0 are satisfied, ΔR, ΔG, and ΔB are set as follows: ΔR=Offset coefficient A×(−1), ΔG=0, ΔB=Offset coefficient D×(−1). If Δa<0 and Δb<0 are satisfied, ΔR, ΔG, and ΔB are set as follows: ΔR=0, ΔG=Offset coefficient B×(−1), ΔB=Offset coefficient D×(−1).

Next, the offset value calculation unit calculates, for each of the display devices 10*a* to 10*d*, ΔL', Δa', and Δb' for each of the initially set ΔR, ΔG, and ΔB as follows.

First, the offset value calculation unit accesses the display devices 10*a* to 10*d* and obtains the reference data (refer to the first embodiment and see FIG. 2) of the display devices 10*a* to 10*d*.

Subsequently, the offset value calculation unit performs the following process for each display device. First, the offset value calculation unit calculates ΔL', Δa', and Δb' that respectively correspond to ΔR, ΔG, and ΔB from the correspondences between sets of RGB values and sets of XYZ values for five colors in the reference data illustrated in FIG. 2.

For example, among four colors respectively having sets of RGB values (240, 240, 240), (224, 240, 240), (240, 224, 240), and (240, 240, 224), sets of XYZ values corresponding to (240, 240, 240) and (224, 240, 240) are converted to sets of L*a*b* values. Then, differences (ΔL', Δa', Δb') obtained by subtracting the L*a*b* values corresponding to the RGB values (240, 240, 240) from the L*a*b* values corresponding to the RGB values (224, 240, 240) are calculated. Theses differences correspond to ΔL', Δa', and Δb' corresponding to ΔR=−16 for the process-target display device. Then, ΔL', Δa', and Δb' are each divided by 16 to calculate ΔL', Δa', and Δb' corresponding to ΔR=−1.

Similarly, ΔL', Δa', and Δb' corresponding to ΔG=−1 are calculated by using the sets of XYZ values corresponding to the sets of RGB values (240, 224, 240) and (240, 240, 240). Further, ΔL', Δa', and Δb' corresponding to ΔB=−1 are calculated by using the sets of XYZ values corresponding to the sets of RGB values (240, 240, 224) and (240, 240, 240).

Accordingly, the offset value calculation unit obtains, for each of ΔR, ΔG, and ΔB, the relationships with ΔL', Δa', and Δb', and thereafter, calculates ΔL', Δa', and Δb' for each of the initially set ΔR, ΔG, and ΔB by using the relationships. The offset value calculation unit repeatedly performs, for each of ΔR, ΔG, and ΔB, resetting (resets ΔR, ΔG, and ΔB) by changing the values of A, B, C, and D until the absolute values of ΔL', Δa', and Δb' are converged to a predetermined value or below. The offset value calculation unit sets the values of ΔR, ΔG, and ΔB when ΔL', Δa', and Δb' are converged to the predetermined value or below as the final offset values.

The offset value calculation unit calculates the offset values for each display device 10 as described above, and thereafter, accesses each display device 10 to set the offset values for the display device 10.

Specifically, when receiving the offset values from the offset value calculation unit of the position determining device 600, the display device 10 stores the offset values in the storage unit 26 and performs image processing by using the offset values. For example, it is assumed that the reference pixel values are (255, 255, 255) and that the offset values for R, G, and B for the display device 10a on the upper left of the multi-display 1000 are (−3, −4, −5). In this case, the image data processing unit 32 of the display device 10a obtains (252, 251, 250) for the reference pixel values (255, 255, 255) as the pixel values after adding the offset values.

Further, the image data processing unit 32 performs, for each of the R, G, and B channels, linear interpolation between the pixel value after adding the offset value to the reference pixel value (255) and the minimum pixel value 0 to obtain a one-dimensional look-up table that indicates a relationship between the input value (0 to the reference pixel value) and the output value (0 to the pixel value after adding the offset value), and stores the one-dimensional look-up table in the storage unit 26.

Then, the image data processing unit 32 uses the one-dimensional look-up table as output tone correction data used in a stage subsequent to the unevenness correction unit 36. That is, the image data processing unit 32 performs tone correction using the one-dimensional look-up table to image data for which color unevenness correction has been performed by the unevenness correction unit 36.

As described above, offset values for making fine adjustments to the output pixel values are set for each display device, and therefore, variations occurring between the display devices adjacent to each other after optimum positioning can be reduced, and the color uniformity of the entire multi-display can be satisfactorily maintained.

Figure 28:
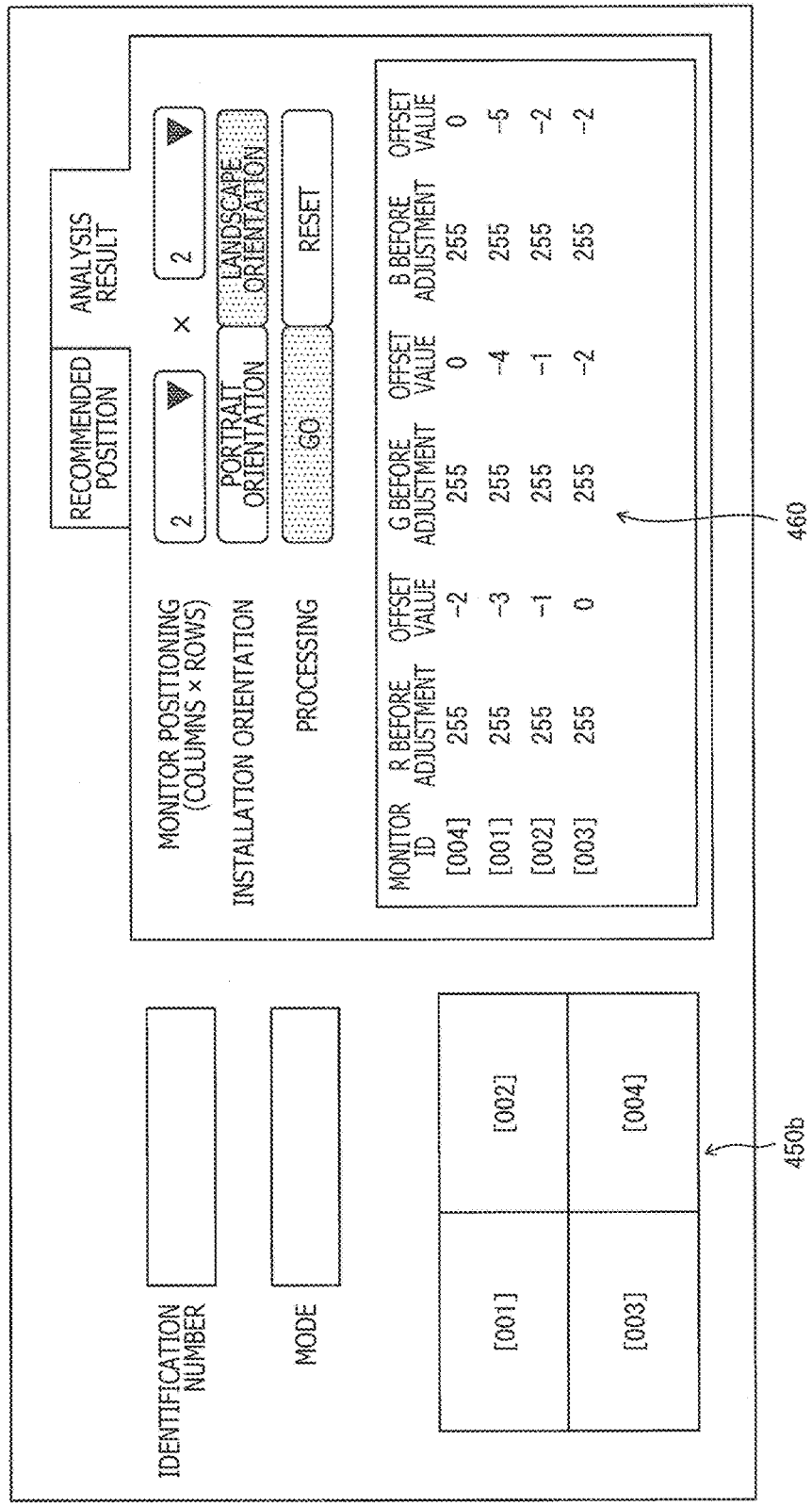
FIG. 28 is a diagram illustrating a UI displayed on the monitor of the position determining device, and illustrates an example different from the example in FIG. 27.

The position determining device 600 may display the UI as illustrated in FIG. 28 on the monitor to allow information to be input, position determination results to be output, and offset value calculation results to be output on the UI. The UI illustrated in FIG. 28 is the same as the UI illustrated in FIG. 27 in terms of the operation in which the operator inputs the identification numbers of the display devices 10, the mode number, the number of monitors to be positioned, and the installation orientation and presses the GO button.

When the GO button is pressed, the result output unit 600d displays a layout (indicated by the reference numeral 450b) that indicates the positions of the display devices also on the UI in FIG. 28. The result output unit 600d further displays the correspondences between the monitor IDs, the reference pixel values before adjustments, and the offset values (indicated by the reference numeral 460) on the UI in FIG. 28. Accordingly, it is possible to easily let the operator know not only the optimum positioning of the display devices 10 but also the offset values to be set for each of the display devices 10.

Note that, in the above example, offset values are calculated by assuming that the reference pixel values are (255, 255, 255). Therefore, R, G, and B values can be adjusted in only the negative direction, and negative offset values are set. In a case where the reference pixel values are assumed to be (240, 240, 240), positive offset values for adjustments in the positive direction are calculated in addition to negative offset values as calculated above, and either the positive offset values or the negative offset values are set as the final offset values, which is specifically described below.

The offset value calculation unit calculates negative offset values as in the example described above for each of the display devices 10a to 10d, and thereafter, initially sets positive offset values (ΔR, ΔG, ΔB) by using Δa and Δb of the target point of each of the display devices 10a to 10d as follows.

If Δa>0 is satisfied, a positive value, which is ΔG=Offset coefficient E, is initially set so as to make G higher (to enhance green).

If Δa<0 is satisfied, a positive value, which is ΔR=Offset coefficient F, is initially set so as to make R higher (to enhance red).

If Δb>0 is satisfied, a positive value, which is ΔB=Offset coefficient G, is initially set so as to make B higher (to enhance blue).

If Δb<0 is satisfied, a positive value, which is ΔR=Offset coefficient H, and a positive value, which is ΔG=Offset coefficient H, are initially set so as to make R and G higher (to enhance yellow).

Note that the offset coefficients E, F, G, and H are positive numbers and are set as follows: E=2, F=1, G=2, H=2, for example. However, these are values that depend on the properties of the display device and may be set to any values. Specifically, if Δa>0 and Δb>0 are satisfied, ΔR, ΔG, and ΔB are set as follows: ΔR=0, ΔG=Offset coefficient E, ΔB=Offset coefficient G. If Δa<0 and Δb>0 are satisfied, ΔR, ΔG, and ΔB are set as follows: ΔR=Offset coefficient F, ΔG=0, ΔB=Offset coefficient G. If Δa>0 and Δb<0 are satisfied, ΔR, ΔG, and ΔB are set as follows: ΔR=Offset coefficient H, ΔG=Offset coefficient E+Offset coefficient H, ΔB=0. If Δa<0 and Δb<0 are satisfied, ΔR, ΔG, and ΔB are set as follows: ΔR=Offset coefficient F+Offset coefficient H, ΔG=Offset coefficient H, ΔB=0.

Next, the offset value calculation unit calculates, for each of the display devices 10a to 10d, ΔL', Δa', and Δb' for each of the initially set positive offset values ΔR, ΔG, and ΔB. The method for calculation is the same as in the case of negative offset values. For example, differences (ΔL', Δa', and Δb') obtained by subtracting the L*a*b* values corresponding to the RGB values (224, 240, 240) from the L*a*b* values corresponding to the RGB values (240, 240, 240) are calculated as ΔL', Δa', and Δb' corresponding to ΔR=+16. Then, ΔL', Δa', and Δb' are each divided by 16 to calculate ΔL', Δa', and Δb' corresponding to ΔR=+1.

Then, the offset value calculation unit repeatedly performs, for each of the positive offset values ΔR, ΔG, and ΔB, resetting (resets ΔR, ΔG, and ΔB) by changing the values of E, F, G, and H until the absolute values of ΔL', Δa', and Δb' are converged to a predetermined value or below. The offset value calculation unit sets the values of ΔR, ΔG, and ΔB when ΔL', Δa', and Δb' are converged to the predetermined value or below as the final positive offset values.

Subsequently, the offset value calculation unit compares ΔE calculated from ΔL', Δa', and Δb' for the positive offset value ΔR with ΔE calculated from ΔL', Δa', and Δb' for the negative offset value ΔR, and sets the offset value (ΔR) that corresponds to ΔE having a smaller value as the final value. The offset value calculation unit similarly sets the final values of ΔG and ΔB. Accordingly, the final ΔR, ΔG, and ΔB are not necessarily have negative values and may have positive values.

(Modifications of Fourth Embodiment)

In the first embodiment, offset values are calculated for one set of reference pixel values (255, 255, 255); however, a plurality of sets of reference pixel values (for example, (225, 225, 225) in addition to (255, 255, 255)) may be set for the R, G, and B channels, offset values may be calculated for each set of reference pixel values, and spline interpolation may be performed by using each set of reference pixel values after adding the offset values to create a one-dimensional look-up table. In this case, the user may be allowed to specify the reference pixel values on the UI, for example.

A multi-display in which the display devices are positioned in accordance with the result of determination by the position determining device 600 according to the second to fourth embodiments is used. The user may want to change the initially set mode in accordance with the user's preference or the use environment. For example, in a case where the brightness of lighting in the environment in which the multi-display is installed is changed, the user may desire to change the mode from the currently used luminance-unevenness-suppression-preferred mode to the high-luminance mode or, on the contrary, from the high-luminance mode to the luminance-unevenness-suppression-preferred mode in order to decrease the luminance slightly and make display more uniform.

In the case where the set mode is changed, the positioning of the display devices that constitute the multi-display can be changed; however, changing the positioning takes time and is troublesome and costly.

Therefore, after the set mode has been changed, offset values (offset values according to the fourth embodiment) may be calculated with which variations among the display devices that newly occur due to the change of the set mode can be suppressed as much as possible without changing the layout of the display devices that constitute the multi-display. Accordingly, it is possible to suppress a decline in the uniformity among the display devices without changing the positioning even if the set mode is changed, which is an advantage.

Specifically, after the mode of each display device has been changed, the position determining device 600 is connected to the display devices 10. The position determining device 600 reads the measurement data sets from each of the display devices 10.

Thereafter, the position determining device 600 receives the changed mode and information indicating the current layout in accordance with a user operation. The information indicating the current layout may be information that indicates correspondences between the identification numbers of the display devices 10 and pieces of position information (sets of coordinate values, for example) indicating the layout. The user is made to input the information.

Subsequently, the position determining device 600 calculates offset values that correspond to the changed mode and the current layout by using the method described in the fourth embodiment and sets the offset values in the display devices 10.

With the method described above, even in the case where the set mode is changed, offset values are calculated and set by using the measurement data stored on each display device so that display in which variations among the display devices are suppressed as much as possible can be performed in the new set mode without changing the layout of the display devices that constitute the multi-display.

In the above description, the example is described where offset values are calculated when the set mode is changed. At the time of installation of a multi-display, display devices may be appropriately positioned as desired by the user without determining optimum positioning, the mode to be used may be set, and thereafter, offset values may be calculated in accordance with the procedure of this modification.

[Example Implementation Using Software]

The control unit 25 and the units 600a to 600d included in the position determining device 600 may be implemented by using a logic circuit (hardware) formed on an integrated circuit (IC chip), for example, or using a CPU (central processing unit) and software.

In the latter case, the control unit 25 and the units 600a to 600d included in the position determining device 600 include a CPU that executes instructions of a program, which is software for implementing the functions, a ROM (read-only memory) or a storage device (each of which is referred to as "recording medium") to which the program and various types of data are recorded so as to be readable by a computer (or CPU), and a RAM (random access memory) to which the program is loaded. When the computer (or CPU) reads the program from the recording medium and executes the program, the object of the present invention is achieved. As the recording medium, a "non-transitory tangible medium", such as a tape, a disc, a card, a semiconductor memory, or a programmable logic circuit, can be used. The program may be supplied to the computer via any transmission medium (a communication network or a broadcast wave, for example) capable of transmitting the program. Note that the present invention can be implemented in the form of a data signal embodied in a carrier wave with which the program is embodied by electronic transmission.

CONCLUSION (Conclusion of First Embodiment)

An image processing device (control unit 25) according to a first aspect of the present invention includes: a selection unit (integrated control unit 31) that allows selection from among at least a first mode and a second mode, which are image quality adjustment modes, in accordance with an input instruction; and a correction unit (unevenness correction unit 36) that performs, both in the first mode and the second mode, color unevenness correction on image data of an image to be displayed on a display panel (display unit 14) by using color unevenness correction data obtained by performing a calibration process. In the second mode, the correction unit performs a pixel value limitation process for uniformly shifting, for each pixel, a pixel value in the image data to a lower pixel value to thereby decrease the pixel value to a pixel value lower than that in the first mode, and thereafter, performs the color unevenness correction.

In the configuration according to the first aspect of the present invention, in the second mode, the pixel value limitation process for shifting the pixel values in the image data to lower pixel values is performed, and thereafter, color unevenness correction is performed. It has been found that, in the second mode, the luminance of the entire image is lower but the degree of luminance unevenness suppression associated with color unevenness suppression is higher than those in a case of performing color unevenness correction without performing the pixel value limitation process or those in a case of performing the pixel value limitation process while making the degree of the shift lower than that in the second mode, and thereafter, performing color unevenness correction.

Accordingly, in the first aspect of the present invention, in a case where high-luminance display is much needed (for example, in a case of using a display device for signage), the first mode is selected to thereby decrease the degree of associated luminance unevenness suppression and enable display of a high-luminance range and, in a case where luminance unevenness suppression is much needed (for example, in a case of using a display device as one of the display devices included in a multi-display), the second mode is selected to thereby decrease the luminance of the entire image and increase the degree of associated luminance unevenness suppression. That is, for uses in which high-luminance display is much needed, high-luminance display can be implemented and, for uses in which luminance unevenness suppression is much needed, the degree of luminance unevenness suppression can be increased. Accordingly, an effect is produced in which, even if the use of a display device varies, image processing that is appropriate for various uses can be implemented.

Note that, in the first aspect of the present invention, the pixel value limitation process is performed, and thereafter, color unevenness correction is performed in the second mode. Therefore, color unevenness suppression is performed while the effect of luminance unevenness suppression associated with the color unevenness suppression is increased, which is an advantage. Here, in the pixel value limitation process, the same adjustment is uniformly made to all pixels, and therefore, the computer is not overloaded. As a result, according to the present invention, the load of the computer is reduced as much as possible while both color unevenness and luminance unevenness are effectively reduced. On the other hand, PTL 1 (Japanese Unexamined Patent Application Publication No. 2013-97115) describes a configuration in which color unevenness correction is originally not performed, and therefore, does not offer an advantage as offered by the present invention.

According to a second aspect of the present invention, in the image processing device, in the first mode, the correction unit performs the color unevenness correction without performing the pixel value limitation process. According to a third aspect of the present invention, in the image processing device according to the second aspect, the selection unit allows selection from among the first mode, the second mode, and a third mode in accordance with the input instruction. In the third mode, the correction unit performs the pixel value limitation process while making the degree of the shift lower than that in the second mode, and thereafter, performs the color unevenness correction.

According to a fourth aspect of the present invention, in the image processing device, in the first mode, the correction unit performs the pixel value limitation process while making the degree of the shift lower than that in the second mode, and thereafter, performs the color unevenness correction. According to a fifth aspect of the present invention, in the image processing device according to the fourth aspect, the selection unit allows selection from among the first mode, the second mode, and a third mode in accordance with the input instruction. In the third mode, the correction unit performs the pixel value limitation process while making the degree of the shift lower than that in the second mode and higher than that in the first mode, and thereafter, performs the color unevenness correction.

With the image processing device according to the third and fifth aspects of the present invention, the third mode is set in a case where high luminance that requires the first mode need not be maintained but luminance is not sufficient with the second mode or in a case where display unevenness suppression that requires the second mode need not be performed but display unevenness is noticeable with the first mode to thereby produce an effect of implementing image processing suitable to these cases.

According to a sixth aspect of the present invention, in the image processing device, the correction unit uses a common color unevenness correction table in both the first mode and the second mode. According to a seventh aspect of the present invention, in the image processing device, the correction unit uses a common color unevenness correction table in all of the first mode, the second mode, and the third mode.

According to the sixth and seventh aspects of the present invention, the color unevenness correction table is used in common in all modes, which produces an effect of further saving a storage capacity than in a configuration in which an unevenness correction table is prepared for each mode.

[Conclusion of Second to Fourth Embodiments]

(Technical Problem Solved by Second Embodiment)

For a multi-display formed by arranging a plurality of display devices, a plurality of positioning patterns are possible; however, the image quality of the entire multi-display is not always the same for all patterns. This is because the specifications or properties vary among the display devices, and image quality unevenness among the display devices may be noticeable in some positioning patterns or such unevenness might not be relatively noticeable in other positioning patterns.

Therefore, for a multi-display, it is desirable to determine a positioning pattern that provides optimum image quality and to arrange all of the display devices in accordance with the positioning pattern. Regarding this, PTL 2 discloses a determination method in which a test image is displayed on each display device, the luminance and chromaticity are measured, and a positioning pattern that provides optimum display quality is determined on the basis of the result of measurement.

Some display devices have a plurality of modes of different degrees of unevenness suppression for luminance unevenness correction, and a mode is selected by a user, as described in PTL 1. Here, in a case where display devices having a plurality of modes are arranged to constitute a multi-display, a positioning pattern may be optimum in a certain mode but another positioning pattern might not be optimum in the mode. This situation was not previously recognized and has been found by the inventors.

That is, even if the method described in PTL 2 is simply applied to the display device having a plurality of modes, measurement is not necessarily performed in a mode that is set in an actual use, and an optimum position determination result for the mode set in the actual use might not be obtained.

The second embodiment has been made in view of the above-described problem, and an object thereof is to provide a position determining device for determining optimum positioning for a multi-display that uses display devices having a plurality of modes of different degrees of unevenness correction.

According to an eighth aspect of the present invention, there is provided a position determining device for determining optimum positioning of display devices in a multi-display. The display devices each have a plurality of modes of different degrees of unevenness correction. The position determining device includes: a mode selection unit that selects one mode from among the plurality of modes in accordance with a user input operation; and a determining unit (position determining unit 600c) that determines optimum positioning of the display devices 10 in the mode selected by the mode selection unit by using a measured value related to the mode selected by the mode selection unit 600b in information stored in a storage unit (the storage unit of the installation server) that stores in advance, for each of the display devices 10, a measured value indicating a color of a test image displayed in each of the plurality of modes.

According to the eighth aspect of the present invention, a measured value related to the mode specified by the user among measured values obtained by measuring a test image adjusted in each of the plurality of modes is used to determine optimum positioning for the mode specified by the user. Therefore, for a multi-display that uses display devices each having a plurality of modes of different degrees of unevenness correction, an effect is produced in which optimum positioning can be determined for a mode used in the actual use.

According to a ninth aspect of the present invention, in the position determining device according to the eighth aspect, the plurality of modes include at least a first mode and a second mode, both the first mode and the second mode are modes in which color unevenness correction for each pixel is performed on image data of an image to be displayed on a display panel by using color unevenness correction data obtained by performing a calibration process, and the second mode is a mode in which a pixel value limitation process for uniformly shifting, for each pixel, a pixel value in the image data to lower luminance is performed to thereby decrease the pixel value to luminance lower than that in the first mode, and thereafter, the color unevenness correction is performed.

According to a tenth aspect of the present invention, the position determining device according to the eighth or ninth aspect further includes a result output unit that displays, on a display unit, information in which identification information of the display devices and position information about the display devices are associated with each other as a determination result. Accordingly, an effect is produced in which the user can easily recognize the result of determination of optimum positioning.

According to an eleventh aspect of the present invention, the position determining device according to the eighth to tenth aspects further includes an offset value calculation unit that, for each of the display devices that constitute the multi-display and for the mode selected by the mode selection unit, (a) calculates a color difference between a desired value of the measured value that is obtained when a test image that corresponds to a predetermined reference pixel value is displayed, the desired value being common to the display devices, and the measured value obtained when the test image that corresponds to the reference pixel value is displayed and (b) calculates, on the basis of the color difference, an offset value that is set for the reference pixel value so as to make the measured value obtained when the test image that corresponds to the reference pixel value is displayed closer to the desired value.

According to the eleventh aspect of the present invention, variations occurring between the display devices adjacent to each other can be reduced by adjusting the output pixel value using the offset value for each display device, which is an advantage. The offset value can be used as follows, for example. First, an offset value is set for each display device. Next, for each display device, the offset value is used to adjust the reference pixel value for each color component, linear interpolation is performed between the reference pixel value after the adjustment and the minimum pixel value (for example, zero) to obtain a one-dimensional look-up table in which a relationship between the input value and the output value is indicated, and the table is retained. Each display device uses the one-dimensional look-up table to perform output tone correction after color unevenness correction.

According to the eleventh aspect of the present invention, there is provided a position determining method for determining optimum positioning of display devices in a multi-display. The display devices each have a plurality of modes of different degrees of unevenness correction. The method includes: a measuring step of obtaining, for each display device among the display devices, a measured value indicating a color of a test image displayed on the display device in each of the plurality of modes; and a determining step of referring to a measured value, among the measured values obtained in the measuring step, that is related to a specified mode specified by a user from among the plurality of modes, and determining optimum positioning of the display devices in the specified mode.

The present invention is not limited to the embodiments described above, and various modifications can be made within the scope set forth in the claims. An embodiment obtained by combining technical means disclosed in different embodiments as appropriate also falls within the technical scope of the present invention. Further, a new technical feature can be formed by combining technical means disclosed in the embodiments.

INDUSTRIAL APPLICABILITY

The present invention is applicable to a display device or a multi-display system formed by arranging a plurality of display devices.

REFERENCE SIGNS LIST 10 display device
14 display unit (display panel)

25 control unit (image processing device)
26 storage unit
31 integrated control unit (selection unit)
35 calibration processing unit
36 unevenness correction unit (correction unit)
40 system control device
50 measuring device
600 position determining device
600a measurement data obtaining unit
600b mode selection unit
600c determining unit (position determining unit)
600d result output unit
601 installation server
1000 multi-display

The invention claimed is:

1. An image processing device comprising:
   selection circuitry that allows selection from among at least a first mode and a second mode, which are image quality adjustment modes, in accordance with an input instruction; and
   correction circuitry that performs, both in the first mode and the second mode, color unevenness correction on image data of an image to be displayed on a display panel by using color unevenness correction data obtained by performing a calibration process, wherein
   in the second mode, the correction circuitry performs a pixel value limitation process that uniformly shifts, for each pixel, a pixel value in the image data to a lower pixel value to thereby decrease the pixel value to a pixel value lower than a corresponding pixel value in the first mode, and thereafter, performs the color unevenness correction.

2. The image processing device according to claim 1, wherein in the first mode, the correction circuitry performs the color unevenness correction without performing the pixel value limitation process.

3. The image processing device according to claim 2, wherein
   the selection circuitry allows selection from among the first mode, the second mode, and a third mode in accordance with the input instruction, and
   in the third mode, the correction circuitry performs the pixel value limitation process while making a degree of the shift lower than a degree of the shift in the second mode, and thereafter, performs the color unevenness correction.

4. The image processing device according to claim 3, wherein the correction circuitry uses a common color unevenness correction table in all of the first mode, the second mode, and the third mode.

5. The image processing device according to claim 1, wherein in the first mode, the correction circuitry performs the pixel value limitation process while making a degree of the shift lower than a degree of the shift in the second mode, and thereafter, performs the color unevenness correction.

6. The image processing device according to claim 5, wherein
   the selection circuitry allows selection from among the first mode, the second mode, and a third mode in accordance with the input instruction, and
   in the third mode, the correction circuitry performs the pixel value limitation process while making a degree of the shift lower than the degree of the shift in the second mode and higher than the degree of the shift in the first mode, and thereafter, performs the color unevenness correction.

7. The image processing device according to claim 1, wherein the correction circuitry uses a common color unevenness correction table in both the first mode and the second mode.

8. A display device comprising: the image processing device according to claim 1; and the display panel.

9. A position determining device that determines optimum positioning of each of display devices included in a multi-display, each of the display devices included in the multi-display being a display device according to claim 8, the position determining device comprising:
   mode selection circuitry that selects one mode from among a first mode and a second mode in accordance with a user input operation; and
   position determining circuitry that determines optimum positioning of each of the display devices in the mode selected by the mode selection circuitry by using a measured value related to the mode selected by the mode selection circuitry in information stored in a storage circuitry that stores in advance, for each of the modes, a measured value obtained by measuring a color of a displayed test image.

10. The position determining device according to claim 9, further comprising:
    result output circuitry that displays, on a display, information in which identification information of the display devices and position information about the display devices are associated with each other as a determination result.

11. The position determining device according to claim 9, further comprising:
    offset value calculation circuitry that, for each of the display devices that constitute the multi-display and for the mode selected by the mode selection circuitry, (a) calculates a color difference between a desired value of the measured value that is obtained when a test image that corresponds to a predetermined reference pixel value is displayed, the desired value being common to the display devices, and the measured value obtained when the test image that corresponds to the reference pixel value is displayed and (b) calculates, on the basis of the color difference, an offset value that is set for the reference pixel value so as to make the measured value obtained when the test image that corresponds to the reference pixel value is displayed closer to the desired value.

12. A non-transitory tangible recording medium recording a program that causes a computer to function as the position determining device according to claim 9 and that causes the computer to function as the circuitry of the position determining device.

13. A position determining method that determines optimum positioning of display devices included in a multi-display,
    each of the display devices included in the multi-display being a display device according to claim 8, the position determining method comprising:
    a measuring step of obtaining, for each display device among the display devices, a measured value indicating a color of a test image displayed on the display device in each of a first mode and a second mode; and
    a determining step of referring to a measured value, among the measured values obtained in the measuring step, that is related to a specified mode specified by a user from among the first mode and the second mode, and determining optimum positioning of the display devices in the specified mode.

14. A non-transitory tangible recording medium recording a program that causes a computer to function as the image processing device according to claim 1 and that causes the computer to function as the circuitry of the image processing device.

* * * * *